(12) United States Patent
Meng et al.

(10) Patent No.: US 12,276,507 B2
(45) Date of Patent: Apr. 15, 2025

(54) INDOOR NAVIGATION METHOD, INDOOR NAVIGATION EQUIPMENT, AND STORAGE MEDIUM

(71) Applicants: Beijing Xiaomi Mobile Software Co., Ltd., Beijing (CN); Beijing Xiaomi Pinecone Electronics Co., Ltd., Beijing (CN)

(72) Inventors: Erli Meng, Beijing (CN); Luting Wang, Beijing (CN)

(73) Assignees: BEIJING XIAOMI MOBILE SOFTWARE CO., LTD., Beijing (CN); BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 455 days.

(21) Appl. No.: 17/645,449

(22) Filed: Dec. 21, 2021

(65) Prior Publication Data

US 2022/0404153 A1    Dec. 22, 2022

(30) Foreign Application Priority Data

Jun. 16, 2021    (CN) .......................... 202110668381.0

(51) Int. Cl.
*G06T 7/73* (2017.01)
*G01C 21/20* (2006.01)
(Continued)

(52) U.S. Cl.
CPC .......... *G01C 21/206* (2013.01); *G06T 1/0014* (2013.01); *G06T 7/73* (2017.01);
(Continued)

(58) Field of Classification Search
None
See application file for complete search history.

(56) References Cited

U.S. PATENT DOCUMENTS

| 11,029,694 B2 * | 6/2021 | Ma ...................... G05D 1/0016 |
| 2019/0162856 A1 | 5/2019 | Atalla |

FOREIGN PATENT DOCUMENTS

| CN | 102713517 A | 10/2012 |
| CN | 110928302 A | 3/2020 |

(Continued)

OTHER PUBLICATIONS

Bizer, C. et al., "A crystallization point for the Web of Data," Journal of Web Semantics, vol. 7, No. 3, Sep. 2009, 25 pages.
(Continued)

*Primary Examiner* — Adam D Tissot
*Assistant Examiner* — Laura E Linhardt
(74) *Attorney, Agent, or Firm* — McCoy Russell LLP

(57) ABSTRACT

An indoor navigation method is provided, including: receiving an instruction for navigation, and collecting an environment image; extracting an instruction room feature and an instruction object feature carried in the instruction, and determining a visual room feature, a visual object feature, and a view angle feature based on the environment image; fusing the instruction object feature and the visual object feature with a first knowledge graph representing an indoor object association relationship to obtain an object feature, and determining a room feature based on the visual room feature and the instruction room feature; and determining a navigation decision based on the view angle feature, the room feature, and the object feature.

15 Claims, 11 Drawing Sheets

(51) Int. Cl.
G06T 1/00 (2006.01)
G06V 10/426 (2022.01)
G06V 10/774 (2022.01)
G06V 10/80 (2022.01)
G06V 20/00 (2022.01)

(52) U.S. Cl.
CPC ........ *G06V 10/426* (2022.01); *G06V 10/7747* (2022.01); *G06V 10/806* (2022.01); *G06V 20/36* (2022.01); *G06T 2207/20072* (2013.01)

(56) References Cited

FOREIGN PATENT DOCUMENTS

| | | |
|---|---|---|
| CN | 112710310 A | 4/2021 |
| CN | 112714896 A | 4/2021 |
| KR | 20210054355 A | 5/2021 |
| WO | 2021058090 A1 | 4/2021 |

OTHER PUBLICATIONS

Speer, R. et al., "ConceptNet 5.5: An Open Multilingual Graph of General Knowledge," Proceedings of the Thirty-First AAAI Conference on Artificial Intelligence, vol. 31, No. 1, Feb. 4, 2017, San Francisco, California, 9 pages.
Chang, A. et al., "Matterport3D: Learning from RGB-D Data in Indoor Environments," Proceedings of the 2017 International Conference on 3D Vision (3DV), Oct. 10, 2017, Qingdao, China, 10 pages.
Kolve, E. et al., "AI2-THOR: An Interactive 3D Environment for Visual AI," arXiv Cornell University Website, Available Online at https://arxiv.org/abs/1712.05474, Available as Early as Dec. 14, 2017, 4 pages.
Lu, Y. et al., "A survey on vision-based UAV navigation," Geo-Spatial Information Science, vol. 21, No. 1, Jan. 12, 2018, 13 pages.
Anderson, P. et al., "Vision-and-Language Navigation: Interpreting Visually-Grounded Navigation Instructions in Real Environments," Proceedings of the IEEE Conference on Computer Vision and Pattern Recognition (CVPR), Jun. 18, 2018, Salt Lake City, Utah, 10 pages.
Gordon, D. et al., "IQA: Visual Question Answering in Interactive Environments," Proceedings of the IEEE Conference on Computer Vision and Pattern Recognition (CVPR), Jun. 18, 2018, Salt Lake City, Utah, 10 pages.
Xia, F. et al., "Gibson Env: Real-World Perception for Embodied Agents," Proceedings of the IEEE Conference on Computer Vision and Pattern Recognition (CVPR), Jun. 18, 2018, Salt Lake City, Utah, 12 pages.
Wang, X. et al., "Look Before You Leap: Bridging Model-Free and Model-Based Reinforcement Learning for Planned-Ahead Vision-and-Language Navigation," Proceedings of the European Conference on Computer Vision, Sep. 8, 2018, Munich, Germany, 18 pages.
Fried, D. et al., "Speaker-Follower Models for Vision-and-Language Navigation," Proceedings of the 32nd International Conference on Neural Information Processing Systems (NIPS'18), Dec. 3, 2018, Montreal, Canada, 25 pages.
Ma, C. et al., "Self-Monitoring Navigation Agent via Auxiliary Progress Estimation," Proceedings of the 2019 International Conference on Learning Representations, May 6, 2019, New Orleans, Louisiana, 18 pages.
Tan, H. et al., "Learning to Navigate Unseen Environments: Back Translation with Environmental Dropout," Proceedings of the Annual Conference of the North American Chapter of the Association for Computational Linguistics, Jun. 3, 2019, Minneapolis, Minnesota, 12 pages.
Ke, L. et al., "Tactical Rewind: Self-Correction via Backtracking in Vision-And-Language Navigation," Proceedings of the IEEE/CVF Conference on Computer Vision and Pattern Recognition (CVPR), Jun. 16, 2019, Long Beach, California, 9 pages.
Wijmans, E. et al., "Embodied Question Answering in Photorealistic Environments With Point Cloud Perception," Proceedings of the IEEE/CVF Conference on Computer Vision and Pattern Recognition (CVPR), Jun. 16, 2019, Long Beach, California, 10 pages.
Wang, X. et al., "Reinforced Cross-Modal Matching and Self-Supervised Imitation Learning for Vision-Language Navigation," Proceedings of the IEEE/CVF Conference on Computer Vision and Pattern Recognition (CVPR), Jun. 16, 2019, Long Beach, California, 10 pages.
Ma, C. et al., "The Regretful Agent: Heuristic-Aided Navigation Through Progress Estimation," Proceedings of the EEE/CVF Conference on Computer Vision and Pattern Recognition (CVPR), Jun. 16, 2019, Long Beach, California, 9 pages.
Qi, M. et al., "KE-GAN: Knowledge Embedded Generative Adversarial Networks for Semi-Supervised Scene Parsing," Proceedings of the IEEE/CVF Conference on Computer Vision and Pattern Recognition (CVPR), Jun. 16, 2019, Long Beach, California, 10 pages.
Singh, A. et al., "From Strings to Things: Knowledge-Enabled VQA Model That Can Read and Reason," Proceedings of the IEEE/CVF Conference on Computer Vision and Pattern Recognition (CVPR), Jun. 16, 2019, Long Beach, California, 11 pages.
Huang, H. et al., "Transferable Representation Learning in Vision-and-Language Navigation," Proceedings of the IEEE/CVF Conference on Computer Vision (ICCV), Oct. 27, 2019, Seoul, Korea, 10 pages.
Qi, Y. et al., "Reverie: Remote Embodied Visual Referring Expression in Real Indoor Environments," Proceedings of the IEEE/CVF Conference on Computer Vision and Pattern Recognition (CVPR), Jun. 13, 2020, Seattle, Washington, 10 pages.
Hao, W. et al., "Towards Learning a Generic Agent for Vision-and-Language Navigation via Pre-Training," Proceedings of the IEEE/CVF Conference on Computer Vision and Pattern Recognition (CVPR), Jun. 13, 2020, Seattle, Washington, 10 pages.
Deng, Z. et al., "Evolving Graphical Planner: Contextual Global Planning for Vision-and-Language Navigation," arXiv Cornell University Website, Available Online at https://arxiv.org/abs/2007.05655, Available as Early as Jul. 11, 2020, 13 pages.
Fu, T. et al., "Counterfactual Vision-and-Language Navigation via Adversarial Path Sampling," Proceedings of the 16th ECCV: European Conference on Computer Vision, Aug. 23, 2020, Glasgow, UK, 16 pages.
Du, H. et al., "Learning Object Relation Graph and Tentative Policy for Visual Navigation," Proceedings of the 16th ECCV: European Conference on Computer Vision, Aug. 23, 2020, Glasgow, UK, 16 pages.
Wang, H. et al., "Soft Expert Reward Learning for Vision-and-Language Navigation," Proceedings of the 16th ECCV: European Conference on Computer Vision, Aug. 23, 2020, Glasgow, UK, 16 pages.
Qi, Y. et al., "Object-and-Action Aware Model for Visual Language Navigation," Proceedings of the 16th ECCV: European Conference on Computer Vision, Aug. 23, 2020, Glasgow, UK, 16 pages.
Zareian, A. et al., "Bridging Knowledge Graphs to Generate Scene Graphs," Proceedings of the 16th ECCV: European Conference on Computer Vision, Aug. 23, 2020, Glasgow, UK, 29 pages.
Hong, Y. et al., "Language and Visual Entity Relationship Graph for Agent Navigation," Proceedings of the Thirty-Fourth Conference on Neural Information Processing Systems, Dec. 6, 2020, Vancouver, Canada, 12 pages.
Anderson, P. et al., "Vision-and-Language Navigation: Interpreting visually-grounded navigation instructions in real environments," arXiv Cornell University Website, Available Online at https://arxiv.org/abs/1711.07280, Available as Early as Nov. 20, 2017, Last Revised Apr. 5, 2018, 11 pages.
Zhu, Z. et al., "Mucko: Multi-Layer Cross-Modal Knowledge Reasoning for Fact-based Visual Question Answering," arXiv Cornell University Website, Available Online at https://arxiv.org/abs/2006.09073, Available as Early as Jun. 16, 2020, Last Revised Nov. 4, 2020, 9 pages.
Hong, Y. et al., "Language and Visual Entity Relationship Graph for Agent Navigation," arXiv Cornell University Website, Available

(56) References Cited

OTHER PUBLICATIONS

Online at https://arxiv.org/abs/2010.09304, Available as Early as Oct. 19, 2020, Last Revised Dec. 25, 2020, 12 pages.
Gao, C. et al., "Room-and-Object Aware Knowledge Reasoning for Remote Embodied Referring Expression," Proceedings of the 2021 IEEE/CVF Conference on Computer Vision and Pattern Recognition (CVPR), Jun. 20, 2021, Nashville, Tennessee, 10 pages.
Chen, H. et al., "Indoor red green blue-depth segmentation based on object-object supportive semantic relationships," Control Theory & Applications, vol. 36, No. 4, Apr. 2019, 10 pages.

* cited by examiner

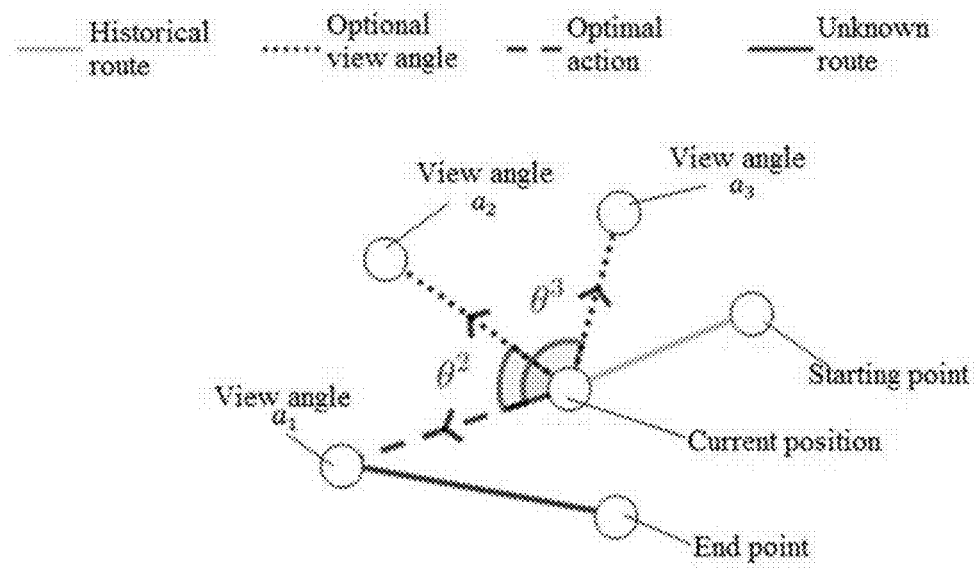
Fig. 12a
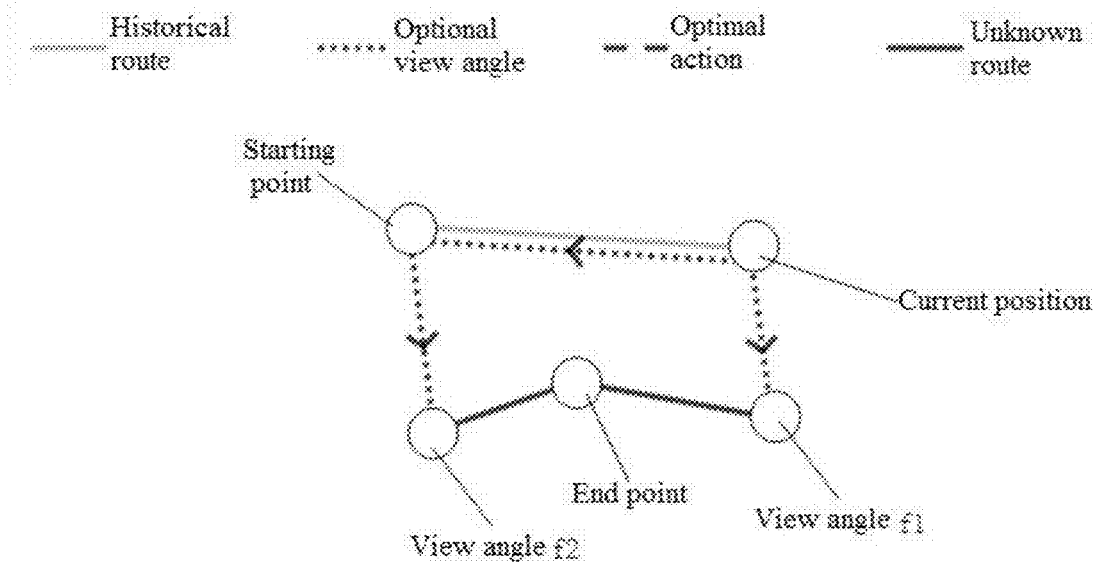
Fig. 12b
| Determining a total loss function based on an imitation learning loss function, a room category prediction loss function, and a direction perception loss function | ～S701 |
↓
| Training a vision-language navigation model based on the total loss function | ～S702 |
Fig. 13

① Sofa, Fireplace, Lamp, Fan  ② Microwave oven, Desk, Vent, Kitchen (a) Language instruction: There is a photo of man above a photo of a woman, go to the bathroom in the bedroom on the left side of the photo to check whether the sink is blocked.

(b) Language instruction: Go to the bedroom and move the hand-shaped chair under the office table.

(c) Language instruction: Go to the office room on the first floor and move the chair out of the office table.

Room: Go wash the bidet in the bathroom of the gym
Object: Go wash the bidet in the bathroom of the gym Room: Go take the white shirt in the wardrobe
Object: Go take the white shirt in the wardrobe Room: Go clean the sink in the bathroom on the first floor
Object: Go clean the sink in the bathroom on the second floor

INDOOR NAVIGATION METHOD, INDOOR NAVIGATION EQUIPMENT, AND STORAGE MEDIUM

CROSS REFERENCE TO RELATED APPLICATION

The present application claims priority to Chinese Patent Application No. 202110668381.0, filed on Jun. 16, 2021. The entire contents of the above-listed application is hereby incorporated by reference for all purposes.

BACKGROUND

Navigation is one of core problems in the field of robots, and there exists strong application requirements in scenarios such as aircraft control, automatic drive, and home service robots. Vision navigation is one of main research problems in representational artificial intelligence, and a model needs to find a specific object in a virtual environment and navigates to the vicinity of the object.

Currently, vision-language navigation (VLN) has become a research field with application prospects. Based on vision navigation, a vision-language navigation model understands user instruction, and performs navigation based on environment information observed at a first view angle.

SUMMARY

The disclosure provides an indoor navigation method, an indoor navigation equipment, and a storage medium.

According to a first aspect of examples of the disclosure, an indoor navigation method is provided, which is applied to an navigation equipment. The indoor navigation method includes: receiving an instruction for navigation, and collecting an environment image; extracting an instruction room feature and an instruction object feature carried in the instruction, and determining a visual room feature, a visual object feature, and a view angle feature based on the environment image; fusing the instruction object feature and the visual object feature with a first knowledge graph representing an indoor object association relationship so as to obtain an object feature, and determining a room feature based on the visual room feature and the instruction room feature; and determining a navigation decision based on the view angle feature, the room feature, and the object feature.

According to another aspect of examples of the disclosure, an indoor navigation equipment is provided. The indoor navigation equipment includes: one or more processors; and one or more memories configured to store instructions executable by the processor. The processor is configured to execute any foregoing indoor navigation method.

According to another aspect of examples of the disclosure, a non-transitory computer-readable storage medium is provided. When an instruction in the storage medium is executed by a processor of a mobile terminal, the mobile terminal can execute any foregoing indoor navigation method.

It should be understood that the foregoing general description and the following detailed description are merely examples and explanatory and are not intended to limit the disclosure.

BRIEF DESCRIPTION OF THE DRAWINGS

The accompanying drawings, which are incorporated in and constitute a part of the description, illustrate examples consistent with the disclosure, and, together with the description, serve to explain the principles of the disclosure.

FIG. 12a is a diagram illustrating a direction perception principle according to an example of the disclosure;

FIG. 12b is a diagram illustrating a distance search principle according to an example of the disclosure;

FIG. 13 is a flowchart of a method for training a navigation model according to an example of the disclosure;

DETAILED DESCRIPTION

Figure 1:
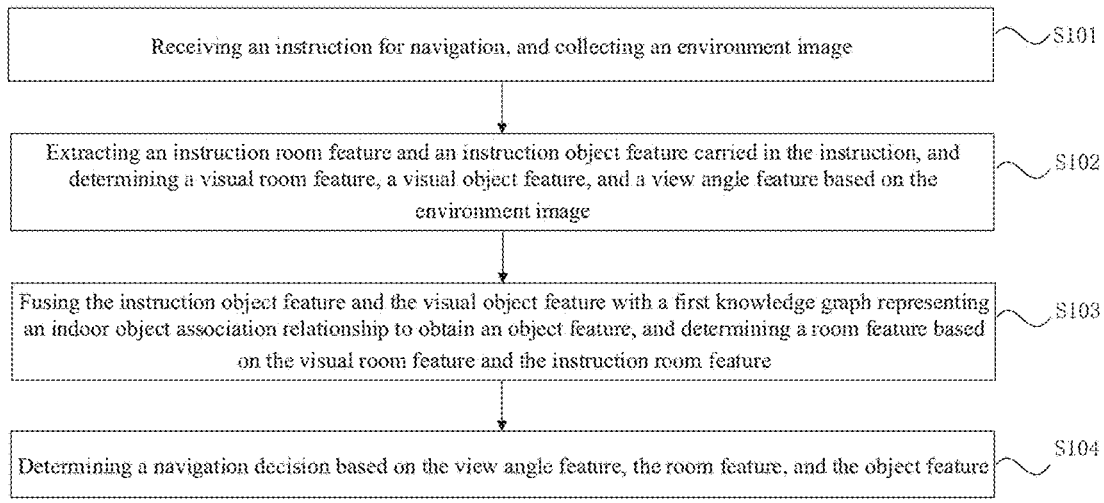
FIG. 1 is a flowchart of an indoor navigation method according to an example of the disclosure.

The examples will be described in detail below, and these examples are illustrated in the accompanying drawings. In the following descriptions of the accompanying drawings, unless otherwise specified, same numbers in different accompanying drawings represent same or similar elements. The implementations described in the following examples do not represent all implementations consistent with the disclosure. Rather, they are merely examples of apparatuses and methods consistent with some aspects of the disclosure.

A vision-language navigation technology has attracted much attention since its emergence. In this technology, navigation equipment not only needs to extract information on route planning from navigation instructions, but also needs to understand the target object of the navigation, so as to complete positioning in an imitator.

In order to further improve flexibility, a remote embodied visual referring expression in real indoor environments (REVERIE) task is put forward. In REVERIE, an abstract instruction training model is used to position a target object. Introduction of an abstract instruction means that the difficulty in instruction understanding and action decision is increased, a navigation effect of the REVERIE task is poor, and user requirements cannot be met.

In related technologies, a pointer module for a traditional vision navigation implementation method takes a visual perception image on a current position and a natural language instruction as input, and calculates and returns three objects that are most consistent with the natural language instruction. Visual features and category labels of the three objects serve as input of a navigator module. The navigator module takes the natural language instruction and the vision perception image on the current position as input, and outputs stop or a next forward direction. If the navigator module outputs the stop, the object that is returned by the pointer module in a current step and that is most similar to the natural language instruction serves as a final output result of the navigation.

In the foregoing navigation process, the navigation equipment has a low long-term memory capability for navigation scenario information. For a target of a navigation task carried in the natural language instruction, for example, "find a specific object in a specific room", the navigation equipment lacks a capability of cross-modal understanding between a room and an object, lacks general knowledge, and has a poor capability of reasoning the association between the room and the object in an unknown environment, so that a navigation effect is not ideal.

Thus, the present disclosure provides an indoor navigation method. The indoor navigation method enhances a capability of cross-modal understanding between a vision modal and a language modal in determining a navigation action decision, and introduces entity knowledge reasoning for the room and the object, so that the action decision in the navigation is more reasonable, and navigation efficiency is improved.

FIG. 1 is a flowchart of an indoor navigation method according to an example of the disclosure. The indoor navigation method is applied to navigation equipment. As shown in FIG. 1, the indoor navigation method includes the following steps.

Step S101: an instruction for navigation is received, and an environment image is collected.

Step S102: an instruction room feature and an instruction object feature carried in the instruction are extracted, and a visual room feature, a visual object feature and a view angle feature are determined based on the environment image.

Step S103: the instruction object feature and the visual object feature are fused with a first knowledge graph representing an indoor object association relationship so as to obtain an object feature, and a room feature is determined based on the visual room feature and the instruction room feature.

Step S104: a navigation decision is determined based on the view angle feature, the room feature, and the object feature.

In this example of the disclosure, when the navigation is performed on the navigation equipment, an instruction for navigation is received. The instruction may be a voice instruction, a language instruction, or the like. The instruction may include all actions that the navigation equipment needs to take. The navigation equipment collects an environment image. The environment image may be a panorama of the environment in which the navigation equipment is located. The instruction may include a room feature and an object feature. The environment image may also include a room feature and an object feature. An instruction room feature and an instruction object feature carried in the instruction are extracted, and vision-related features, that is, a visual room feature, a visual object feature, and a view angle feature are determined based on the environment image. The view angle feature is configured to reflect information carried in the view angle of the environment image and decouple and extract the room feature and object feature input by the instruction and the environment image. The instruction object feature and the visual object feature are fused with the first knowledge graph for reasoning to obtain the object feature. The first knowledge graph is constructed based on general knowledge and configured to represent an indoor object association relationship. The room association is explicitly learned based on the visual room feature and the instruction room feature, to determine the room feature. The navigation decision is determined based on the determined view angle feature, the room feature, and the object feature.

According to an example of the disclosure, the visual feature and the instruction feature are processed respectively to obtain a plurality of features representing room information and object information. The features representing different types of information are fused to finally obtain the object feature and the room feature and determine the navigation decision. During the navigation action decision is determined, the long-term memory of the scenario information is maintained, the room and the object are explicitly recognized from the visual input and the language input by means of a room and object perception attention mechanism, a semantic gap between the visual modal and the language modal is filled, a capability of understanding between the visual modal and the language modal is enhanced, entity knowledge reasoning of the room and the object is introduced and the introduction of general knowledge improves a capability of capturing a complicated relationship between the room and the object, so that the action decision in navigation is more reasonable.

Figure 2:
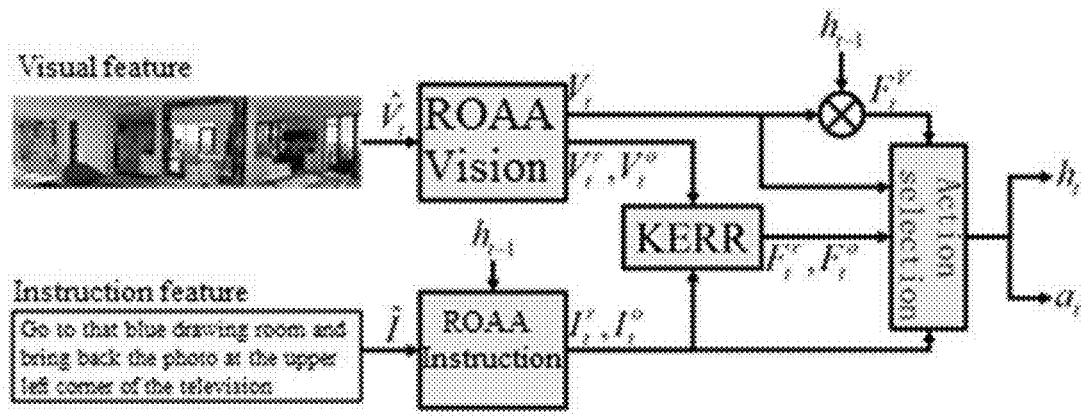
FIG. 2 is a schematic diagram of architecture of a cross-modal knowledge reasoning model according to an example of the disclosure.

In some examples, the indoor navigation method may be implemented by using a cross-modal knowledge reasoning model. FIG. 2 is a schematic diagram of architecture of a cross-modal knowledge reasoning model according to an example of the disclosure. Referring to FIG. 2, the cross-modal knowledge reasoning model is based on Transformer encoder-decoder architecture. The encoder is configured to extract a feature of a language instruction for navigation, and the decoder is configured to model a timing decision process. A room and object perception attention (ROAA) module may be arranged between the encoder and the decoder to explicitly decouple the room feature and the object feature in the language instruction and the environment image. The general knowledge in ConceptNet is introduced using a knowledge-driven entity relationship reasoning (KERR) module, and the general knowledge is fused with the visual feature, a room cross-modal feature, and an object cross-modal feature to obtain a scenario memory token. An action selection module uses the Transformer decoder to analyze the obtained scenario memory token, so as to obtain an implicit vector in a current time step to determine the navigation decision.

In an example of the disclosure, the instruction for navigation is received, the environment image is collected, the instruction feature Î carried in the instruction is extracted, and the visual feature $\hat{V}_t$ is determined based on the environment image. The visual feature $\hat{V}_t$ and the instruction feature Î are processed by the room perception attention module and the object perception attention module to obtain a view angle feature $V_t$, a visual room feature $V_t^r$, a visual object feature $V_t^o$, an instruction room feature, and an instruction object feature $I_t^o$. The foregoing features are fused with the general knowledge in the knowledge-driven entity relationship reasoning module, and then exist in a form of a room feature $F_t^r$ and an object feature $F_t^o$. A fourth feature fusing and reinforcing operation is performed on the view angle feature $V_t$ and the implicit vector $h_{t-1}$ stored in a previous time step to obtain a total view angle feature $F_t^V$:

$$F_t^V = V_t^T \cdot \text{softmax}(V_t W_V h_{t-1})$$

Here, $W_V$ is a learnable parameter, and the fourth feature fusing and reinforcing operation may be an operation of an attention mechanism that takes the view angle feature $V_t$, the learnable parameter, and the implicit vector $h_{t-1}$ as input and takes a view angle feature as output, to fuse a plurality of view angle features, so that the view angle feature highly associated with the implicit vector $h_{t-1}$ is reserved to a greater extent.

The action selection module generates the implicit vector $h_t$ and a decision result $a_t$ by using the foregoing features.

In an example of the disclosure, determining a navigation decision may be implemented based on a vision-language navigation CKR model, and visual positioning may be implemented based on a ViLBERT model. For the CKR model in the example of the disclosure, during model training, an implicit vector dimension $D_h$ may be 512, and a word vector dimension $D_w$ may be 300. A batch size is 100, an optimizer is Adam, a weight decay is 5e−4, and a learning rate is 1e−4. Proportions of items of the loss function are $\lambda_1=1$, $\lambda_2=1$, and $\lambda_3=5$. It takes approximately 10 GPU hours to obtain an optimal CKR model by training in a student mode.

The ViLBERT model can be slightly adjusted on a REVERIE data set. The training data is an object RoI feature in the natural language instruction and the environment image. A batch size is 60, a learning rate is 2e−5, and a training time is approximately 8 GPU hours. In a testing stage, an object with the highest matching score is selected as a prediction result.

Figure 3:
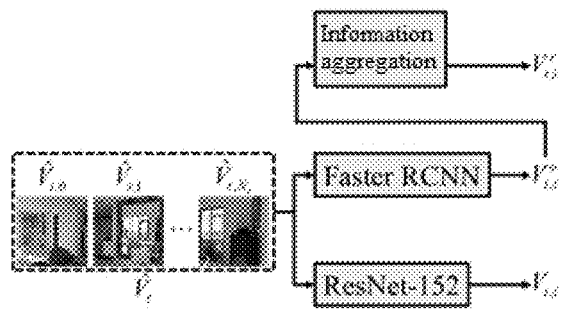
FIG. 3 is a schematic diagram of architecture of a model for extracting visual feature carried in an environment image according to an example of the disclosure.

FIG. 3 is a schematic diagram of architecture of a model for extracting a visual feature carried in an environment image according to an example of the disclosure. As shown in FIG. 3, a total number of the optional view angles is $N_r$. For the i-th optional view angle ($1 \leq i \leq N_r$), a Faster R-CNN pre-trained on a Visual Genome data set is used first to perform target detection on the visual feature $\hat{V}_{t,i}$, so as to obtain a set $V_{t,i}^o$ of $N_{t,i}^v$ significant objects. For example, if the i-th optional view angle faces a bedroom, $V_{t,i}^o$ may include objects such as a bed and a bedside table. An initial vector $V_{t,i}^j$ may be obtained through splicing of a visual RoI feature and a category-corresponding GloVe feature of a j-th significant object in the i-th optional view angle.

Since the category of a room largely depends on objects in the room, the visual room feature $V_{t,i}^r$ may be obtained through aggregation of visual object features $V_{t,i}^o$.

$$V_{t,i}^r = \sum_{j=1}^{N_{t,i}^v} V_{t,i}^j$$

Figure 4:
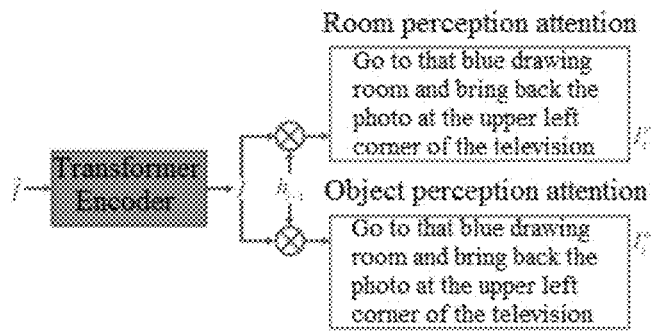
FIG. 4 is a schematic diagram of a room perception attention module and an object perception attention module for extracting instruction room feature and instruction object feature carried in a voice instruction according to an example of the disclosure.

FIG. 4 is a schematic diagram of a room perception attention module and an object perception attention module for extracting an instruction room feature and an instruction object feature carried in a voice instruction according to an example of the disclosure. The instruction room feature and the instruction object feature carried in the voice instruction are extracted respectively. The voice instruction for navigation may be abstracted into a format of "find a specific object in a specific room". The instruction $\hat{I}=\{\hat{w}_1, \hat{w}_2, \ldots, \hat{w}_L\}$ is processed by a Transformer encoder based on a GloVe initialized word vector $\hat{w}_i \in \mathbb{R}^{D_w}$ to obtain an optimized instruction feature $I=\{w_1, w_2, \ldots, w_L\} \in \mathbb{R}^{L \times D_w}$. Here, $D_w$ represents a word vector dimension, and L represents an instruction length in words.

In an example of the disclosure, the voice instruction I is decoupled into an instruction room feature $I_t^r \in \mathbb{R}^{D_w}$ and an instruction object feature $I_t^o \in \mathbb{R}^{D_w}$ by using a room perception attention module and an object perception attention module. The room perception attention module and the object perception attention module use an implicit vector $h_{t-1} \in \mathbb{R}^{D_k}$ as a query vector, and perform decoupling based on the attention mechanism.

$$I_t^r = I_t \cdot \text{softmax}(I_t W_r h_{t-1})$$

$$I_t^o = I_t \cdot \text{softmax}(I_t W_o h_{t-1})$$

Here, $W_r \in \mathbb{R}^{D_w \times D_h}$ and $W_o \in \mathbb{R}^{D_w \times D_h}$ represent a room perception attention parameter and an object perception attention parameter respectively.

The instruction room feature $I_t^r$ and the instruction object feature $I_t^o$ are used in different ways, and $W_r$ and $W_o$ are different in optimization direction during training. It may be understood that the instruction room feature $I_t^r$ may include more room-related information, and the instruction object feature $I_t^o$ includes more object-related information. For example, for the voice instruction "Go to that blue drawing room and bring back the photo at the upper left corner of the television", the room perception attention module pays attention to "drawing room" in the voice instruction, and the object perception attention module pays attention to "photo" and "television" in the voice instruction.

Figure 5:
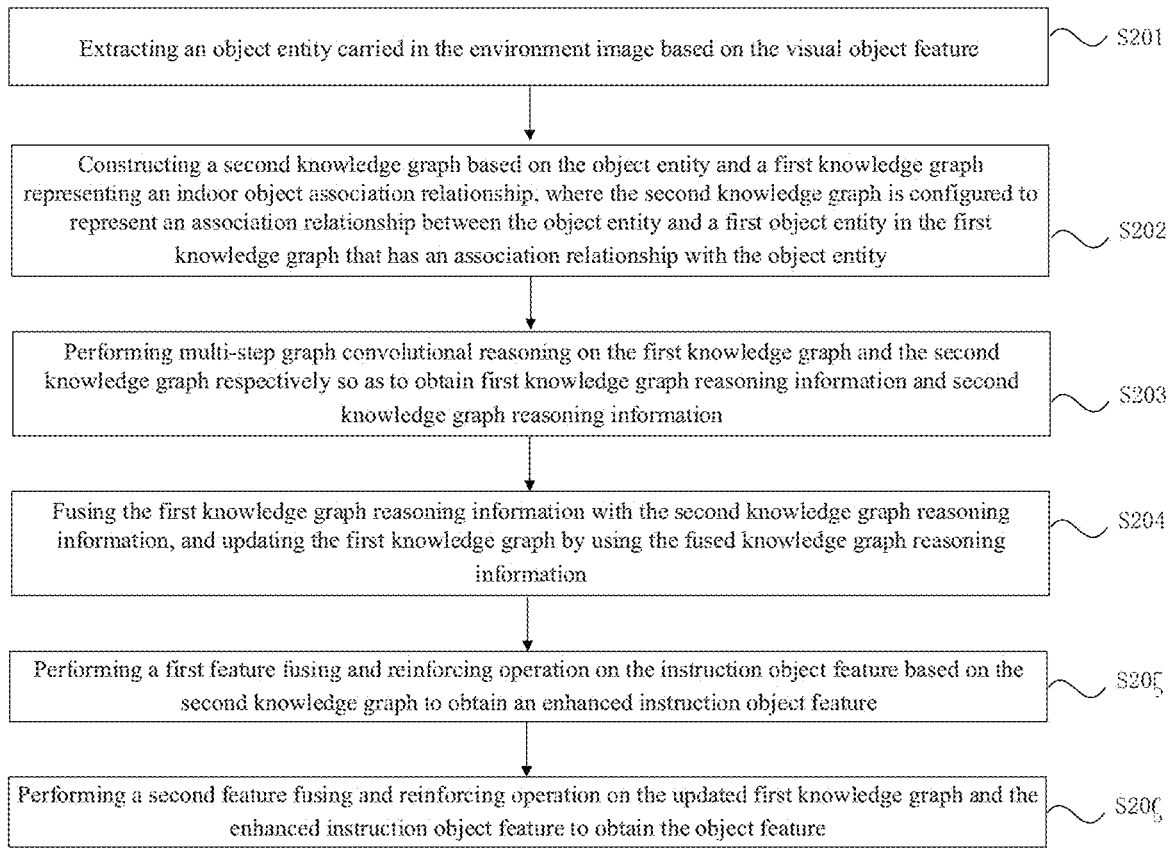
FIG. 5 is a flowchart of a method for fusing instruction object feature and visual object feature with first knowledge graph representing indoor object association relationship so as to obtain object feature according to an example of the disclosure.

FIG. 5 is a flowchart of a method for fusing an instruction object feature and a visual object feature with a first knowledge graph representing an indoor object association relationship to obtain an object feature according to an example of the disclosure. As shown in FIG. 5, the method includes the following steps.

Step S201: an object entity carried in the environment image is extracted based on the visual object feature.

Step S202: a second knowledge graph is constructed based on the object entity and the first knowledge graph representing the indoor object association relationship, where the second knowledge graph is configured to represent an association relationship between the object entity and a first object entity in the first knowledge graph that has an association relationship with the object entity.

Step S203: multi-step graph convolutional reasoning is performed on the first knowledge graph and the second knowledge graph respectively, so as to obtain first knowledge graph reasoning information and second knowledge graph reasoning information.

Step S204: the first knowledge graph reasoning information is fused with the second knowledge graph reasoning information, and the first knowledge graph is updated by using the fused knowledge graph reasoning information.

Step S205: a first feature fusing and reinforcing operation is performed on the instruction object feature based on the second knowledge graph to obtain an enhanced instruction object feature.

Step S206: a second feature fusing and reinforcing operation is performed on the updated first knowledge graph and the enhanced instruction object feature to obtain an object feature.

In an example of the disclosure, the instruction room feature $\hat{I}$ and the instruction object feature $I_t^o$ are extracted from the voice instruction, and the view angle feature $V_t$, the visual room feature $V_t^r$, and the visual object feature $V_t^o$ are extracted from the environment image.

The indoor navigation knowledge graph may be constructed based on the ConceptNet. The general knowledge is introduced during room and object reasoning. A target detector used in a 0-th step in a navigation task can distinguish 1600 objects which are recorded as $\{h_1, h_2, \ldots, h_{1600}\}$ and which covers categories of all objects labelled in an indoor navigation task data set. For the category $h_i$, K pieces of most associated general knowledge $\{f_{i,1}, f_{i,2}, \ldots, f_{i,K}\}$ are retrieved in the ConceptNet, and each piece of general knowledge is stored in a form of triple and may be represented as $f_{i,j}=(h_i, r_{i,j}, t_j)$. Here, $t_j$ represents a target category, and $r_{i,j}$ represents an association degree of $h_i$ and $t_j$.

A retrieved target category set $\{t_1, t_2, \ldots, t_K\}$ represents K categories that are most highly associated with $h_i$ on a semantic and spatial co-occurrence level. A plurality of general knowledge triples may constitute a weighted undirected graph $G^E=(H^E, E^E)$. Here, $H^E$ represents a category set, $E^E$ represents an edge set of all general knowledge, and $A^E$ is recorded as an adjacent matrix of $G^E$. For each node in $H^E$, that is, an object category, a GloVe initiated feature vector is used, and $H^E \in \mathbb{R}^{N^E \times D_w}$.

The adjacent matrix $A^E \in \mathbb{R}^{N^E \times N^E}$ of the weighted undirected graph $G^E$ is initiated by using the association degree in the ConceptNet, $A_{ij}^E = r_{i,j}$, and $A_{ij}^E$ corresponds to a general knowledge triple $f_{i,j}=(h_i, r_{i,j}, t_j)$. Based on the node feature provided by the ConceptNet, $A_{ij}^E$ may be represented as:

$$A_{ij}^E = \langle h_i, t_j \rangle$$

As K increases, noise in $G^E$ also increases gradually. In order to reduce impact of the noise, a first knowledge graph $G^I=(H^I, E^I)$ a second knowledge graph $G^E$ are created, where the second knowledge graph $G^E$ is configured to represent an association relationship between an object entity and a first object entity in the first knowledge graph that has an association relationship with the object entity. $H^I \in \mathbb{R}^{1600 \times D_w}$ represents a node feature matrix and is initiated by using a GloVe feature. $A^I \in \mathbb{R}^{1600 \times 1600}$ represents an adjacent matrix of $G^I$, matrix elements represent association degrees between different nodes, and the initiation method is the same as that of $A^E$.

For the i-th optional view angle, the object entity carried in the environment image is extracted based on the visual object feature $V_{t,i}^o$ to construct a complete sub-graph $G^I \supseteq G_{t,i}^I = (H_{t,i}^I, E_{t,i}^I)$. Here, $H_{t,i}^I \in \mathbb{R}^{N_{t,i}^v \times D_w}$ represents a node feature matrix obtained through sampling based on the visual object feature $V_{t,i}^o$, and $A_{t,i}^I \in \mathbb{R}^{N_{t,i}^v \times N_{t,i}^v}$ is a submatrix of $A^I$.

A second knowledge graph is constructed based on the object entity and the first knowledge graph representing the indoor object association relationship, where the second knowledge graph is configured to represent an association relationship between the object entity and a first object entity in the first knowledge graph that has an association relationship with the object entity. The second knowledge graph $G^E \supseteq G_{t,i}^E = (H_{t,i}^E, E_{t,i}^E)$ is dynamically extracted from $G^E$, and the reasoning process of the second knowledge graph is combined with the reasoning process of the first knowledge graph.

Multi-step graph convolutional reasoning is performed on the first knowledge graph and the second knowledge graph respectively, so as to obtain first knowledge graph reasoning information and second knowledge graph reasoning information. This may be represented by the following equation:

$$\begin{cases} H^{E(k)} = \delta(A^E H^{E(k-1)} W^{E(k)}) \\ H^{E(0)} = H^E \end{cases}$$

Here, k is the number of iterations for graph reasoning, $\delta$ is an activation function, $W^{E(k)}$ is a learnable parameter, and $H^{E(k)}$ is a node feature matrix of $G^{E(k)}$. Graph convolution is used to transmit information between adjacent nodes in the first knowledge graph and the second knowledge graph. Total-graph-level information transmission is implemented through multi-step iteration, so that each node in the first knowledge graph and the second knowledge graph perceives the surrounding graph structure.

The first knowledge graph reasoning information is fused with the second knowledge graph reasoning information, and the first knowledge graph is updated by using the fused knowledge graph reasoning information. For the i-th optional view angle, a sub-node feature matrix $H_{t,i}^{E(k)} \in \mathbb{R}^{N_{t,i}^v \times D_w}$ is sampled in $H^{E(k)}$ by using the visual object feature $V_{t,i}^o$ as an index, and a node feature matrix of the first knowledge graph and a node feature matrix of the second knowledge graph are averaged, so that a conclusion of general knowledge reasoning is absorbed and $H_{t,i}^{E(k)}$ is used to help the reasoning of the first knowledge graph, namely:

$$\begin{cases} H_{t,i}^{I(k+1)} = \delta(A_{t,i}^I \tilde{H}_{t,i}^{I(k)} W^{I(k+1)}) \\ \tilde{H}_{t,i}^{I(k)} = (H_{t,i}^{I(k)} + H_{t,i}^{E(k)})/2 \\ H_{t,i}^{I(0)} = H_{t,i}^I \end{cases}$$

A first feature fusing and reinforcing operation is performed on the instruction object feature based on the second knowledge graph to obtain an enhanced instruction object feature, which is represented through the following equation:

$$I_t^{o'} = H_{t,i}^{E^T} \text{softmax}(H_{t,i}^E W_f I_t^o)$$

Here, $W_f$ is a learnable parameter, and the first feature fusing and reinforcing operation may be an attention operation that takes the node feature matrix of the second knowledge graph, the learnable parameter, and the instruction object feature as input, so that the enhanced instruction object feature is obtained. A second feature fusing and reinforcing operation is performed on the updated first knowledge graph $H_t^{I(K)}$ and the enhanced instruction object feature $I_t^{o'}$. The second feature fusing and reinforcing operation may also be an attention operation to enhance an importance degree of the object entity, highly associated with the enhanced instruction object feature $I_t^{o'}$, in the first knowledge graph, so that the object feature $F_t^o$ is obtained. $F_t^o$ may be obtained through the following equation.

$$F_t^o = H_t^{I(K)T} \text{softmax}(H_t^{I(K)} W_o I_t^{o'})$$

In an example of the disclosure, the first knowledge graph and the second knowledge graph are constructed based on the general knowledge, internal and external association between a room and an object is learned based on limited known environment and is applied to the unknown environment, so that a capability of determining a complicated relationship between the room and the object is improved in knowledge reasoning of the room and object entity, and the reasonable action decision in navigation is guaranteed.

Figure 6:
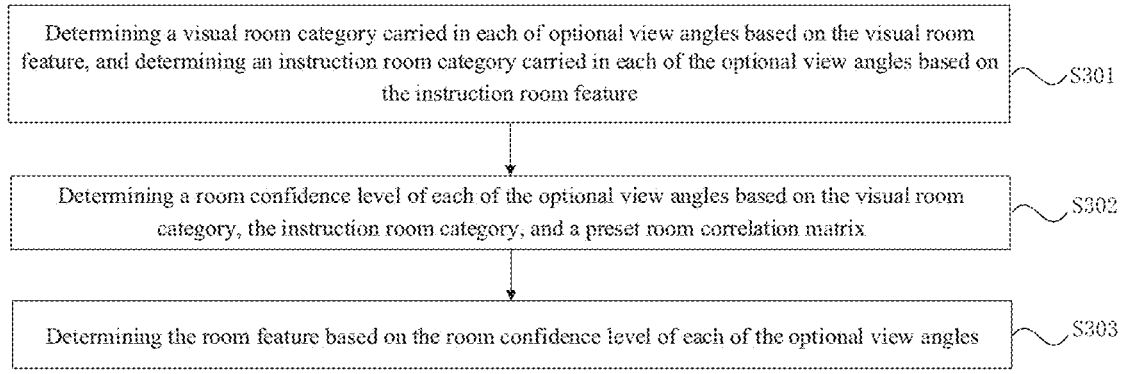
FIG. 6 is a flowchart of a method for determining room feature based on visual room feature and an instruction room feature according to an example of the disclosure.

FIG. 6 is a flowchart of a method for determining a room feature based on a visual room feature and an instruction room feature according to an example of the disclosure. As shown in FIG. 6, the method includes the following steps.

Step S301: a visual room category carried in each of optional view angles is determined based on the visual room feature, and an instruction room category carried in each of the optional view angles is determined based on the instruction room feature.

Step S302: a room confidence level of each of optional view angles is determined based on the visual room category, the instruction room category, and a preset room correlation matrix.

Step S303: a room feature is determined based on the room confidence level of each of optional view angles.

In an example of the disclosure, the instruction room feature $\hat{I}$ and the instruction object feature $I_t^o$ are extracted from the voice instruction, and the view angle feature $V_t$, the visual room feature $V_t^r$, and the visual object feature $V_t^o$ are extracted from the environment image. The room feature $F_t^r$ is determined based on the visual room feature $V_t^r$ and the instruction room feature $\hat{I}$.

Figure 7:
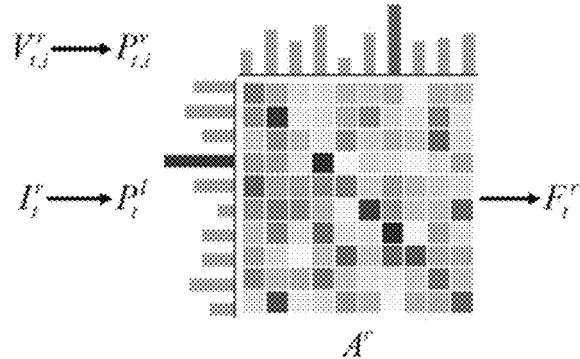
FIG. 7 is a schematic diagram for determining room feature according to an example of the disclosure.

FIG. 7 is a schematic diagram for determining a room feature according to an example of the disclosure. Referring to FIG. 7, a room association matrix is $A^r \in \mathbb{R}^{N_r \times N_r}$. Here, $N_r$ represents the number of room categories that may exist, and an element $A_{i,j}^r$ in the matrix represents a confidence level of reaching a room i through a room j. Human beings can judge association relationships between rooms. For example, if a navigation destination is kitchen, people generally choose to enter a dining room to find a possible route instead of choosing to enter a bedroom. The room feature may be represented through the following equations:

$$P_{t,i}^v = \text{softmax}(FC(V_{t,i}^r))$$

$$P_t^I = \text{softmax}(FC(I_t^r))$$

Here, a room category $P_{t,i}^v \in \mathbb{R}^N$, from the i-th optional view angle and a room category $P_t^I \in \mathbb{R}^N$, described by the language instruction are supervised based on a true room category provided by the model, and a confidence level of the i-th optional view angle may be represented as:

$$\mathbb{R} \ni s_{t,i} = P_t^{IT} A^r P_{t,i}^v$$

In the foregoing equation, $P_{t,i}^v$ and $P_t^I$ are one-hot vectors. Here, the vector $P_{t,i}^v$ takes 1 only at the $k_v$-th element and takes 0 at other elements. The vector $P_t^I$ takes 1 only at the $k_I$-th element and takes 0 at other elements. The foregoing equation may be degenerated into a $k_I$-th-row $k_v$-th-column element value that takes $s_{t,i}$ that is, $s_{t,i}$ describes a probability that the target room category can be reached from the i-th optional view angle.

The room feature $F_t^r \in \mathbb{R}^{N_t}$ is defined as a vector composed of confidence levels of all the optional view angles as follows:

$$F_t^r = \{s_{t,1}, s_{t,2}, \ldots, s_{t,N_t}\}$$

In an example of the disclosure, during room category reasoning, a visual room category carried in each of the optional view angles is determined based on the visual room feature, an instruction room category carried in each of the optional view angles is determined based on the instruction room feature, the room confidence level of each of the optional view angles is determined based on the visual room category, the instruction room category, and a preset room association matrix, a room feature is determined based on the room confidence level of each of the optional view angles, and the association between the room categories is explicitly learned, so that the reasonable action decision in navigation is guaranteed.

Figure 8:
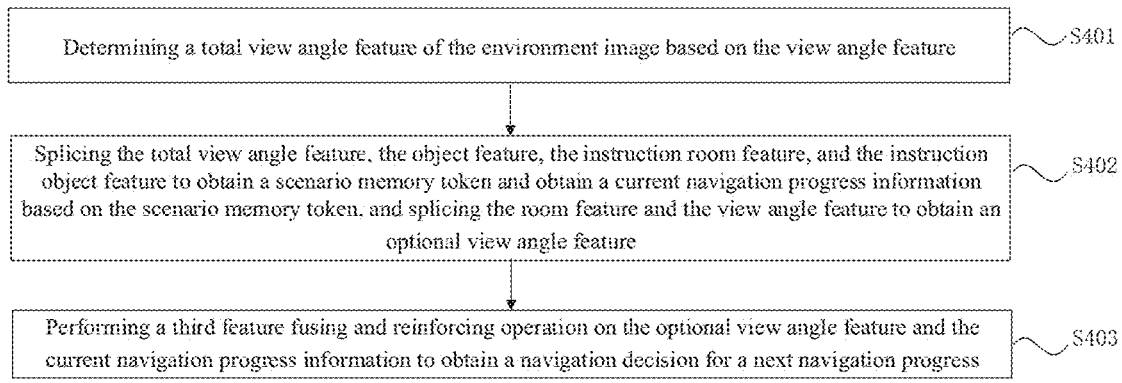
FIG. 8 is a flowchart of a method for determining a navigation decision based on a view angle feature, a room feature and an object feature according to an example of the disclosure.

FIG. 8 is a flowchart of a method for determining a navigation decision based on a view angle feature, a room feature, and an object feature according to an example of the disclosure. As shown in FIG. 8, the method includes the following steps.

Step S401: a total view angle feature of the environment image is determined based on the view angle feature.

Step S402: the total view angle feature, the object feature, the instruction room feature, and the instruction object feature are spliced to obtain a scenario memory token, and a current navigation progress information is obtained based on the scenario memory token, and the room feature and the view angle feature are spliced to obtain an optional view angle feature.

Step S403: a third feature fusing and reinforcing operation is performed on the optional view angle feature and the current navigation progress information to obtain a navigation decision for a next navigation progress.

In an example of the disclosure, the instruction room feature $\hat{I}$ and the instruction object feature $I_t^o$ are extracted from the voice instruction, and the view angle feature $V_t$, the visual room feature $V_t^r$ and the visual object feature $V_t^o$ are extracted from the environment image. Since the feature is extracted from the environment image based on visual information and the visual information is rich in information amount, a view angle feature $V_t$ is also extracted from the environment image. A plurality of view angle features $V_t$ are fused to obtain a total view angle feature $F_t^v$ of the environment image.

Figure 9:
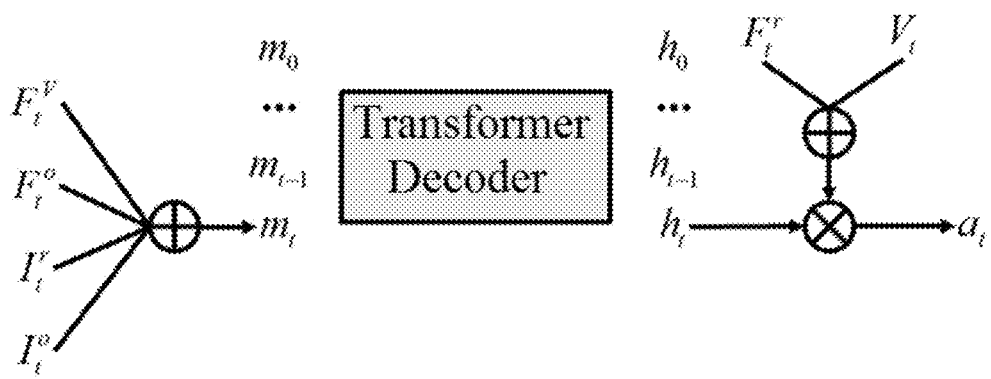
FIG. 9 is a schematic diagram of a principle for determining a navigation decision according to an example of the disclosure.

FIG. 9 is a schematic diagram of a principle of determining a navigation decision according to an example of the disclosure. Referring to FIG. 9, the instruction room feature $\hat{I}$ and the instruction object feature $I_t^o$ are extracted from the voice instruction, and the view angle feature $V_t$ the visual room feature $V_t^r$, and the visual object feature $V_t^o$ are extracted from the environment image. A total view angle feature $F_t^v$ of the environment image is determined based on the view angle feature $V_t$. The total view angle feature $F_t^v$, the object feature $F_t^o$, the instruction room feature $\hat{I}$, and the instruction object feature $I_t^o$ are spliced to obtain a scenario memory token $m_t$. The scenario memory token $m_t$ is configured to summarize current environment scenario information of the navigation equipment. The scenario memory token $m_t$ is processed by using a Transformer decoder to obtain an implicit vector $h_t$ representing current navigation progress information. The room feature $F_t^r$ and the view angle feature $V_t$ are spliced to obtain each of the optional view angle features. A third feature fusing and reinforcing operation is performed on each optional view angle feature and the current navigation progress information $h_t$ to greatly reserve the optional view angle feature that is most significantly associated with the navigation progress information and to obtain a navigation decision $a_t$ for a next navigation progress. The third operation may be an attention operation performed on each optional view angle feature and the current navigation progress information $h_t$, and may be represented by the following equation:

$$p_t = \text{softmax}([F_t^r, V_t]W_a h_t)$$

$$a_t = \arg\max_a p_{t,a}$$

Here, $p_{t,a}$ represents a probability of selecting action a in a current time step.

In an example of the disclosure, the total view angle feature $F_t^v$, the object feature $F_t^o$, the instruction room feature $\hat{I}$, and the instruction object feature $I_t^o$ are spliced to obtain the scenario memory token, the scenario memory token is inputted into the decoder in time sequence, rich information carried in the scenario memory token is mined in a Transformer model based on a learnable multi-layer attention network, and the navigation decision is determined, so that the action decision in navigation is more reasonable.

Figure 10:
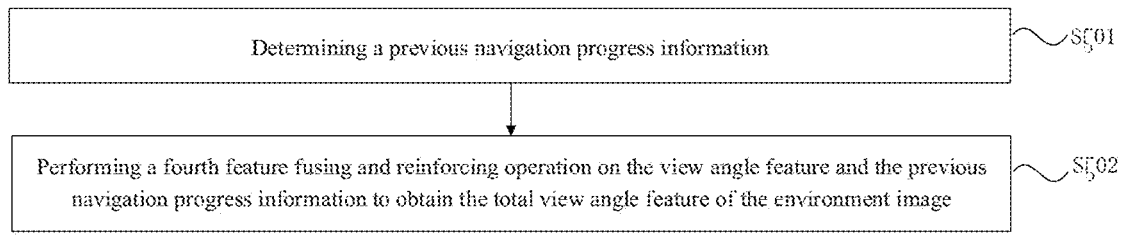
FIG. 10 is a flowchart of a method for determining a total view angle feature of an environment image based on a view angle feature according to an example of the disclosure.

FIG. 10 is a flowchart of a method for determining a total view angle feature of an environment image based on a view angle feature according to an example of the disclosure. As shown in FIG. 10, the method includes the following steps.

Step S501: a previous navigation progress information is determined.

Step S502: a fourth feature fusing and reinforcing operation is performed on the view angle feature and the previous navigation progress information to obtain the total view angle feature of the environment image.

In this example of the disclosure, the instruction room feature $\hat{I}$ and the instruction object feature $I_t^o$ are extracted from the voice instruction, and the view angle feature $V_t$, the visual room feature $V_t^r$, and the visual object feature are extracted from the environment image. Since the feature is extracted from the environment image based on visual information and the visual information includes rich information, a view angle feature is also extracted from the environment image. A plurality of view angle features are fused to obtain a total view angle feature of the environment image.

The view angle feature $V_t$, the visual room feature $V_t^r$, the visual object feature $V_t^o$, the instruction room feature $I_t^r$, and the instruction object feature $I_t^o$ are obtained based on the visual feature $\hat{V}_t$ and the instruction feature $\hat{I}$. The foregoing features are fused with the general knowledge, and then exist in a form of a room feature $F_t^r$ and an object feature $F_t^o$.

In this example of the disclosure, in order to output feature fusing expression of the view angle feature $V_t$ that is most significantly associated with the navigation progress information $h_{t-1}$ stored in the previous step, a fourth feature fusing and reinforcing operation is performed on the view angle feature $V_t$ and an implicit vector $h_{t-1}$ of the navigation progress information stored in the previous step to obtain a total view angle feature $F_t^V \cdot F_t^V$ may be determined through the following equation.

$$F_t^V = V_t^T \cdot \text{softmax}(V_t W_V h_{t-1})$$

Here, $W_V$ is a learnable parameter, and the fourth feature fusing and reinforcing operation may be an operation of an attention mechanism that takes the view angle feature $V_t$, the learnable parameter, and the implicit vector $h_{t-1}$ as input and a view angle feature as output, to fuse a plurality of view angle features, so that the view angle feature that is highly associated with the implicit vector $h_{t-1}$ is reserved to a greater extent.

In this example of the disclosure, a plurality of view angle features are fused to obtain the total view angle feature of the environment image, so that the common feature of the plurality of view angles can be reflected. The information amount for the navigation decision is enriched by using the total view angle feature, so that the reasonable action decision in navigation is guaranteed.

Figure 11:
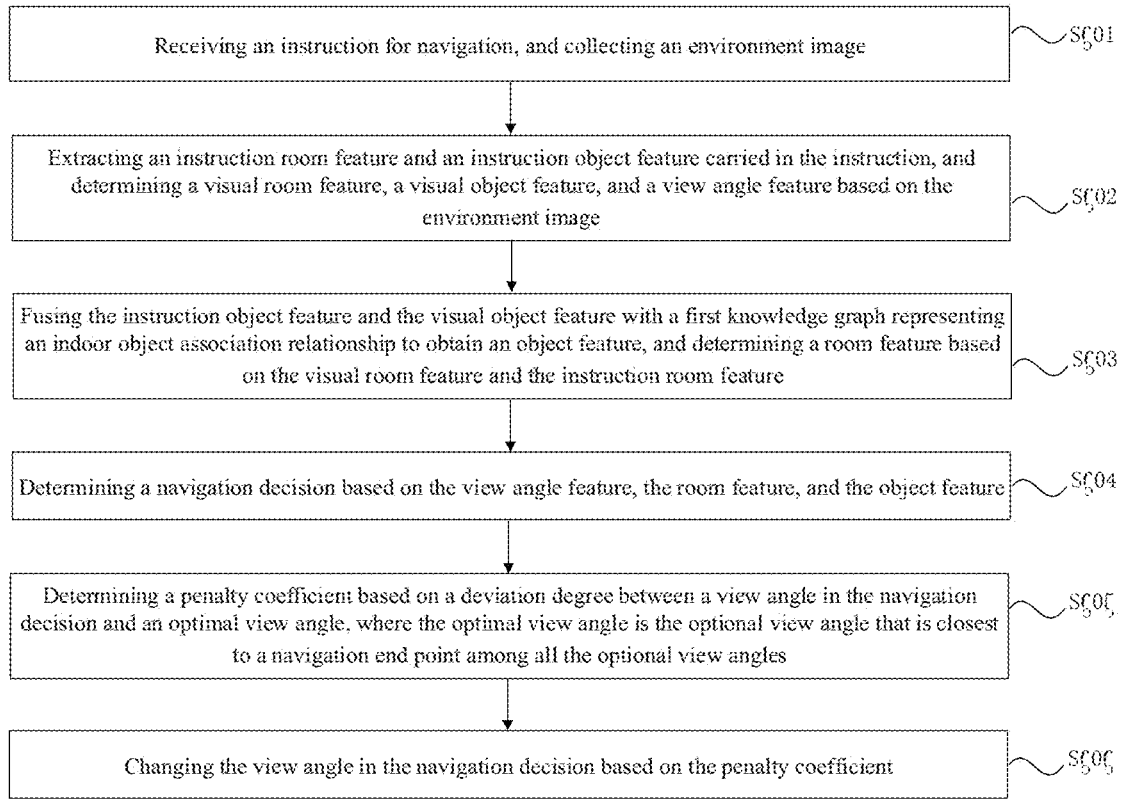
FIG. 11 is a flowchart of an indoor navigation method according to an example of the disclosure.

FIG. 11 is a flowchart of an indoor navigation method according to an example of the disclosure. As shown in FIG. 11, the indoor navigation method includes the following steps.

Step S601: an instruction for navigation is received, and an environment image is collected.

Step S602: an instruction room feature and an instruction object feature carried in the voice instruction is extracted, and a visual room feature, a visual object feature, and a view angle feature are determined based on the environment image.

Step S603: the instruction object feature and the visual object feature are fused with a first knowledge graph representing an indoor object association relationship to obtain an object feature, and a room feature is determined based on the visual room feature and the instruction room feature.

Step S604: a navigation decision is determined based on the view angle feature, the room feature, and the object feature.

Step S605: a penalty coefficient is determined based on a deviation degree between a view angle in the navigation decision and an optimal view angle, where the optimal view angle is the optional view angle that is closest to a navigation end point among all the optional view angles.

Step S606: the view angle in the navigation decision is changed based on the penalty coefficient.

In this example of the disclosure, direction and distance are important elements in a navigation process. In order to pay attention to the determination of the navigation direction in the navigation process, the penalty coefficient is determined based on the deviation degree between the view angle in the navigation decision and the optimal view angle, so as to change the view angle in the navigation decision.

FIG. 12a is a diagram illustrating a direction perception principle according to an example of the disclosure. In a t-th time step, a navigation decision is determined based on a probability $p_t$, that is, $a_t \in \{a_1, a_2, a_3\}$. $a_0$ represents stop action, and in FIG. 12a, $a_1$ represents the optimal view angle. In the navigation process, it is expected that the navigation equipment should at least perform exploration in a direction substantially toward a target. One view angle is selected from an optional view angle set $\{a_0, a_1, a_2, a_3\}$ as the view angle for a next step of selection and is recorded as $a_1$, based on the action probability $P_t$. A penalty coefficient is determined based on a deviation degree between an optional view angle in the navigation decision and an optimal view angle $a_1$, where the larger the deviation degree between the optional view angle and the optimal view angle $a_1$, the larger the corresponding penalty coefficient. The calculation equations for direction perception loss may be represented as follows:

$$f(\theta) = (1-\cos\theta)/2$$

$$L_{dir} = \sum_{t=1}^{T}\sum_{a=0}^{N_t} f(\theta_{t,a})p_{t,a}$$

Here, $\theta_{t,a} \in [0, \pi]$ represents an included angle between the optional view angle $\alpha$ and the optimal view angle $a_1$, and the included angles between the stop action $a_0$ and other optional view angles are each defined as $\pi/2$.

In this example of the disclosure, the penalty coefficient is determined based on the deviation degree between the view angle in the navigation decision and the optimal view angle, and the view angle in the navigation decision is changed based on the penalty coefficient, so that navigation efficiency of a model is improved.

Table 1 shows impact of a direction perception loss weight $\lambda_3$. For a Val-Seen data set, no significant improvement is obtained by increasing the weight $\lambda_3$ from 2 to 10. When $\lambda_3$ is 5, the improvement caused by direction perception loss is most significant, and an SPL index is improved from 51.79% to 56.02%. For a Val-Unseen data set, performance with $\lambda_3$ set at 10 is higher than performance with $\lambda_3$ set at 0. The SPL index is improved from 8.11% to 11.05%, and an RSR index is improved from 7.91% to 10.04%. A TL index is decreased, which indicates that direction perception loss can help the model in the examples of the disclosure improve exploration efficiency.

TABLE 1

| $\lambda_3$ | VAL-SEEN | | | VAL-UNSEEN | | |
|---|---|---|---|---|---|---|
| | SPL↑ | TL↓ | RSR↑ | SPL↑ | TL↓ | RSR↑ |
| 0 | 51.79 | 12.58 | 34.14 | 8.11 | 17.60 | 7.91 |
| 2 | 53.02 | 11.57 | 40.34 | 11.90 | 14.59 | 8.80 |
| 5 | 56.02 | 11.86 | 39.26 | 9.76 | 14.90 | 8.87 |
| 10 | 51.39 | 12.39 | 36.24 | 11.05 | 16.36 | 10.04 |

FIG. 13 is a flowchart of a method for training a navigation model according to an example of the disclosure. As shown in FIG. 13, the method for training a navigation model includes the following steps.

Step S701: a total loss function is determined based on an imitation learning loss function, a room category prediction loss function, and a direction perception loss function, where the imitation learning loss function is configured to represent a deviation degree between the optional view angle and the optimal view angle, the room category prediction loss function is configured to represent a deviation degree between a room category corresponding to the optional view angle and a room category in the navigation decision, and the direction perception loss function is configured to represent a deviation degree between the view angle in the navigation decision and the optimal view angle.

Step S702: a vision-language navigation model is trained based on the total loss function.

In this example of the disclosure, the navigation decision is determined based on the vision-language navigation model, and a training target of the vision-language navigation model may be composed of imitation learning loss, room category prediction loss, and direction perception loss. A process of training the vision-language navigation model uses a student mode. In a t-th time step, the vision-language navigation model predicts a probability $p_{t,a}$ for each of the optional view angles $\alpha$. The optional view angle that is closest to the navigation task end point is defined as the optimal view angle. The imitation learning loss function may be represented through the following equation.

$$L_i = \sum_{t=1}^{T} -\log p_{t,\hat{a}_t}$$

Here, T represents stop time or the longest operation duration of the navigation process, and the imitation learning loss function represents the deviation degree between the optional view angle and the optimal view angle.

$\hat{r}$ represents a room category at the navigation end point, and $\hat{r}_{t,i}$ is a room category from an i-th optional view angle in a t-th time step. The deviation degree between the room category corresponding to the optional view angle and the room category in the navigation decision is reflected based on the room category prediction loss function. The room category prediction loss function may be represented as follows:

$$L_r = \sum_{t=1}^{T}\left(-\log[P_t^I]_{\hat{r}} - \sum_{i=1}^{N_t}\log[P_{t,i}^v]_{\hat{r}_{t,i}}\right)$$

The total loss function may be defined as follows:

$$L = \lambda_1 L_i + \lambda_2 L_r + \lambda_3 L_{dir}$$

Here, $\lambda_i$, i=1, 2, 3 represents relative weights of the loss function respectively.

Figure 14:
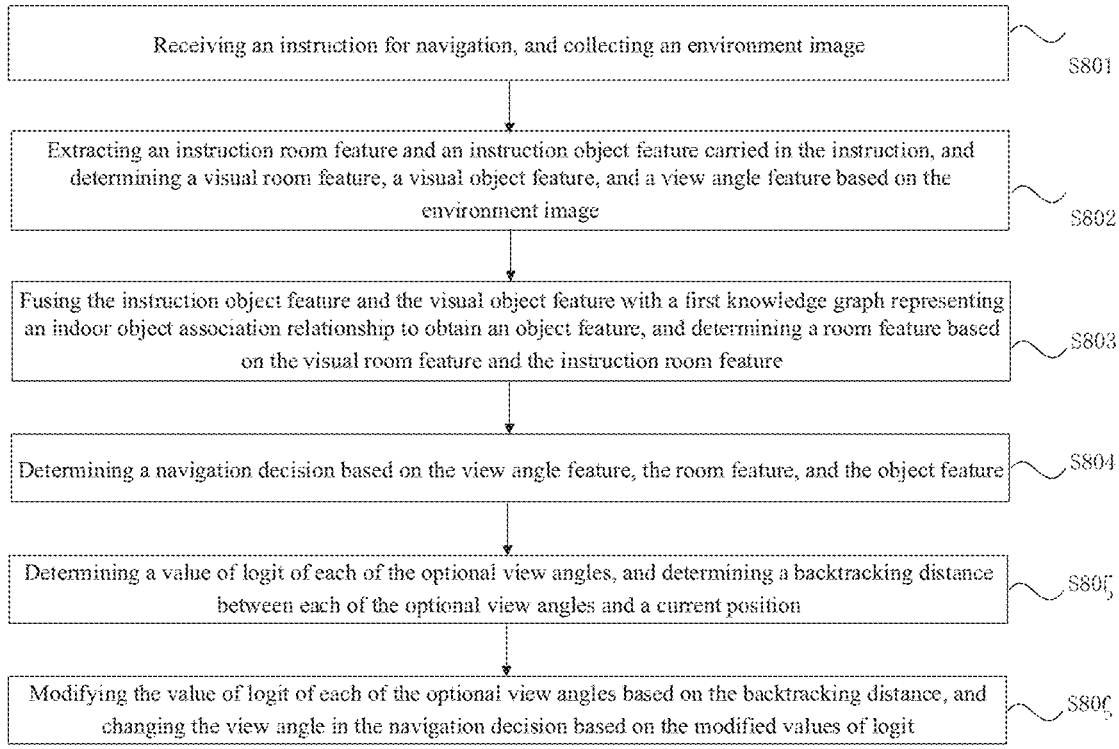
FIG. 14 is a flowchart of an indoor navigation method according to an example of the disclosure.

FIG. 14 is a flowchart of an indoor navigation method according to an example of the disclosure. As shown in FIG. 14, the indoor navigation method includes the following steps.

Step S801: an instruction for navigation is received, and an environment image is collected.

Step S802: an instruction room feature and an instruction object feature carried in the instruction are extracted, and a visual room feature, a visual object feature, and a view angle feature are determined based on the environment image.

Step S803: the instruction object feature and the visual object feature are fused with a first knowledge graph representing an indoor object association relationship to obtain an object feature, and a room feature is determined based on the visual room feature and the instruction room feature.

Step S804: a navigation decision is determined based on the view angle feature, the room feature, and the object feature.

Step S805: the value of logit of each of the optional view angles is determined, and a backtracking distance between each of the optional view angles and a current position is determined.

Step S806: the value of logit of each of the optional view angles is modified based on the backtracking distance, and the view angle in the navigation decision is changed based on the modified values of logit.

FIG. 12b is a diagram illustrating a distance search principle according to an example of the disclosure. A vision-language navigation task may be deemed as a search problem on an optional view angle graph. In order to ensure efficiency and improve a navigation success rate, a frontier aware search with backtracking (FAST) may be used. The FAST algorithm uses local information and global information, makes the navigation decision based on a historical navigation progress, and can efficiently backtrack to a correct route when being aware of a route error. The historical optional view angle is added to a current optional view angle list, then the optional view angle with the highest value of logit is selected, and the shortest route for reaching the position is planned based on a known map. As shown in FIG. 12b, the view angle $f_2$ is closer to the end point than the view angle $f_1$, so that the value of logit of the view angle $f_2$ is greater than the value of logit of the view angle $f_1$. In the FAST algorithm, the navigation decision is to backtrack to the starting point and then to the view angle, meaning that this algorithm cannot obtain the optimal route. The value of logit of each of the optional view angles is determined, a backtracking distance between each of the optional view angles and a current position is determined, the value of logit of each of the optional view angles is modified based on the backtracking distance, and the view angle in the navigation decision is changed based on the modified values of logit. The modified value of logit may be represented as follows:

$$logit'=logit/d^w$$

Here, d represents the distance from the current position to the optional view angle, and also controls a hyperparameter of a distance weight.

In this example of the disclosure, during determination of the navigation decision, the value of logit of each of the optional view angles is modified based on the backtracking distance, the view angle in the navigation decision is changed based on the modified values of logit, and the navigation equipment sufficiently considers a distance factor in a navigation process, so that efficiency is improved.

Table 2 shows impact of a distance weight w on navigation performance for distance aware search. In this experiment, the value of w ranges from 0 to 10. When w is set to 0, this means that distance aware search is not applicable. It is observed that as w increases, a TL index continuously decreases. For the Val-Unseen data set, when w is set to 2, the TL index sharply decreases from 37.09 m to 22.37 m. Although an SR index also decreases from 19.91% to 17.30%, the decreasing amplitude is less than that of the TL index, so that an SPL index increases by 1.42%. As the distance weight w increases, the decreasing amplitude of the SR index starts to exceed that of the TL index, and the SPL index also starts to decrease. For the Val-Seen data set, impact of adjustment of w on the SR, TL, or even SPL index is not significant since the TL index for the Val-Seen data set is already quite small, so the effect of the distance aware search is weakened.

TABLE 2

| w | VAL-SEEN | | | VAL-UNSEEN | | |
|---|---|---|---|---|---|---|
| | SR↑ | TL↓ | SPL↑ | SR↑ | TL↓ | SPL↑ |
| 0 | 57.27 | 12.66 | 53.14 | 19.91 | 37.09 | 10.56 |
| 0.5 | 57.13 | 12.24 | 53.4 | 19.37 | 30.26 | 11.13 |
| 1 | 57.27 | 12.16 | 53.57 | 19.14 | 26.26 | 11.84 |
| 2 | 57.41 | 11.99 | 53.67 | 17.3 | 22.37 | 11.98 |
| 10 | 57.48 | 11.85 | 53.71 | 16.56 | 20.35 | 11.89 |

FIG. 15 to FIG. 19 are visualized schematic diagrams of an indoor navigation method according to an example of the disclosure. In order to more visually display actions of the model applied in the examples of the disclosure in a navigation process, some samples are visualized. A visualization result is composed of an environment image, a room category prediction result, a room category true value, and a significant object set. In each environment image, the numbers such as ①, ②, and ③ represent optional view angles, and characters below the number represent the room category prediction result (left) and the room category true value (right). For each of the optional view angles, a result of a target detection model is marked below the environment image.

Figure 15:
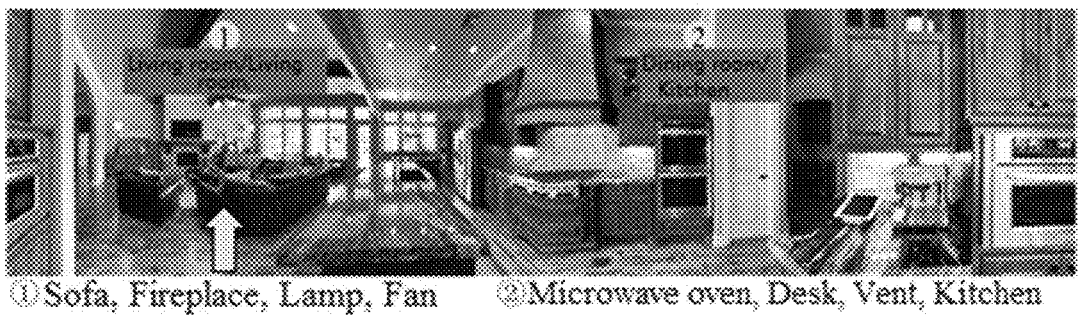
FIG. 15 to FIG. 19 are visualized schematic diagrams of an indoor navigation method according to an example of the disclosure.

The corresponding language instruction in FIG. 15 is "There is a photo of a man above a photo of a woman, go to the bathroom in the bedroom on the left side of the photo to check whether the sink is blocked". A navigation starting point of the navigation equipment is located between the kitchen and the living room. Since the semantics of "kitchen" and "dining room" are relatively similar, a room category detection error does not affect action selection of the navigation equipment. There are objects such as sofa, fireplace, lamp, and fan on the left side of the kitchen, so it is likely to be the living room. Since there are "bedroom" and "bathroom" in the language instruction, these room categories are more closely associated with the living room than the kitchen, the navigation decision of the navigation equipment is to pass through the living room to find the target object.

Figure 16:
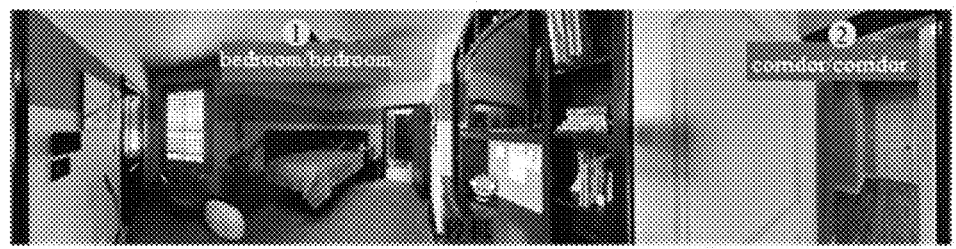

The corresponding language instruction in FIG. 16 is "Go to the bedroom and move the hand-shaped chair under the office table". In the environment image observed by the navigation equipment before the navigation equipment decides to stop, there are objects such as "bed", "lamp", "book", and "fan" on the left side, so it is likely to be a bedroom, and there are objects such as "door" and "floor" on the right side, so it is likely to be a corridor. After analyzing in combination with the language instruction, it is determined that the target room for navigation is the bedroom, and the navigation decision of the navigation equipment is to stop.

Figure 17:
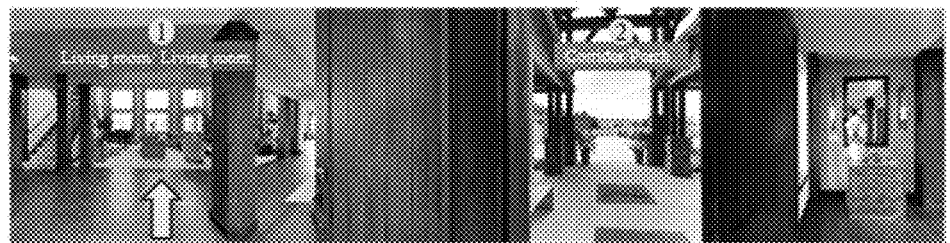

The corresponding language instruction in FIG. 17 is "Go to the office on the first floor and move the chair out of the office table". The navigation equipment at the door detects objects such as "window", "chair", "pillar", and "step" on the indoor side and objects such as "plant", "sky", "ground", and "roof" on the outdoor side. Naturally, the office should be located indoors, so that the navigation decision of the navigation equipment is to move towards the indoors.

Figure 18:

FIG. 18 shows differences between a CKR model in the examples of the disclosure and a REVERIE baseline model in a navigation process. The two models are placed on the same position in the same virtual environment. In FIG. 18, the left side shows the navigation process of the REVERIE baseline model, and the right side shows the navigation process of the CKR model in the examples of the disclosure. For the same natural language instruction "Go to the bathroom on the first floor and take toilet paper out of the shelf on the sink", the CKR model and the REVERIE baseline model have totally the same action decisions in the first two time steps. Both the models consider that it is necessary to explore the room in front of them, but they soon find that there is no target object in the room, so they return to the starting position along the same way they came. Starting from a third time step, the navigation processes of the two models begin to become different. The CKR model notices stairs on the right side and decides to go down stairs to continue exploring. Comparatively, the REVERIE baseline model goes straight forward along the corridor beside the stairs. After several time steps, the two models both find the bathroom on respective floors and successively position the toilet paper in the bathroom. However, the floor where the REVERIE baseline model is located is the second floor and is different from the natural language instruction, so navigation fails.

Figures 19, 20:
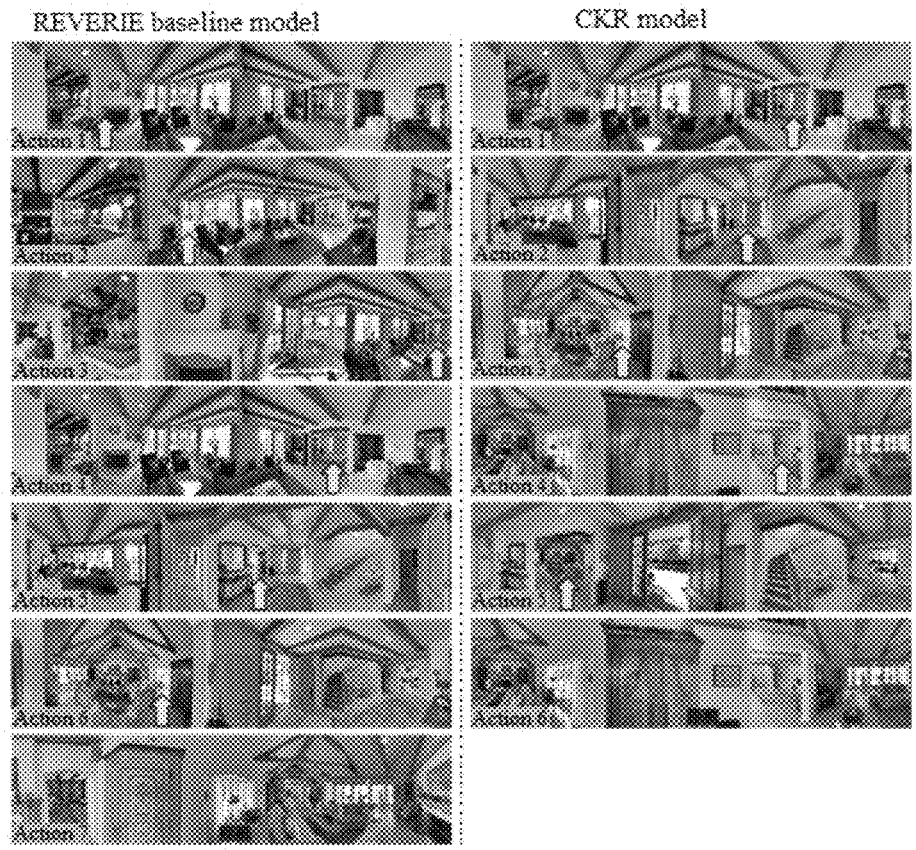
FIG. 20 illustrates operation results of a room perception attention module and an object perception attention module according to an example of the disclosure.

FIG. 19 shows a diagram comparing effects of the CKR model applied in the examples of the disclosure and the REVERIE baseline model that are placed on the same position in the same virtual environment with an input language instruction of "Go to the living room on the first floor and bring back the wheelchair beside the wardrobe". In the navigation process of the CKR model in the examples of the disclosure, in the first time step, the navigation equipment finds that it stays in a room, but there is no wardrobe here as described in the natural language instruction, so it decides to leave the room. After two time steps, the navigation equipment comes up to the wardrobe as described in the instruction. However, because the navigation distance is excessively short, the model does not dare to choose stop action easily, and the navigation equipment decides to check the surroundings of the current position. So in the fifth time step, the navigation equipment returns to the hall again, but the position is slightly different from that in the third time step. Through confirmation, the navigation equipment believes that the wardrobe found in the fourth time step is just the wardrobe described in the natural language instruction, so it returns to the wardrobe in the sixth time step and decides to stop. Due to the view angle, the wheelchair cannot be directly observed in the action 6 shown on the right side in FIG. 19. However, this problem does not exist in the image input to an object positioning network, so target detection can be normally performed.

In the first three time steps of the navigation process of the REVERIE baseline model, the navigation equipment searches the current room first. After finding that there is no wardrobe as described in the natural language instruction in the current room, the navigation equipment returns to the starting point in the fourth time step. Starting from the fifth time step, the action decision of the REVERIE baseline model is similar to that of the CKR model except for the last time step. In the sixth time step, the navigation equipment arrives outside the living room, but it goes to a cabinet on the inner side during action selection. Although the cabinet looks like the wardrobe, there is no wheelchair as described in the natural language instruction at this position, so navigation fails.

FIG. 20 illustrates operation results of a room perception attention module and an object perception attention module according to an example of the disclosure. A darker color represents a larger attention weight, and then the model pays more attention to this part of content. In the three samples, the room perception attention module pays attention to words "bathroom", "wardrobe", and "bathroom", and attention weights of other parts of the instruction are relatively low; and the object perception attention module pays attention to words "bidet", "shirt", and "sink" and sometimes also pays attention to object-related verbs or adjectives such as "wash", "white", and "clean", but on the whole, it has a stronger object perception capability. It may be learned that the room perception attention module and the object perception attention module effectively implement display decoupling of room and object information in the language instruction, and this information helps the subsequent knowledge reasoning and action decision process.

Based on the same concept, an example of the disclosure further provides an indoor navigation apparatus.

It may be understood that, in order to implement the foregoing functions, the apparatus provided in this example of the disclosure includes hardware structures and/or software modules for implementing all the functions. With reference to units and algorithm steps of all the examples disclosed in the examples of the disclosure, the examples of the disclosure can be implemented by using hardware or by combining hardware and computer software. Whether a specific function is implemented by using the hardware or by using the hardware driven by the computer software depends on specific application and design constraint conditions of the technical solution. A skilled in the art can implement the described functions by using different methods for each specific application, but this implementation shall not be deemed as departing from the scope of the technical solution of the examples of the disclosure.

Figure 21:
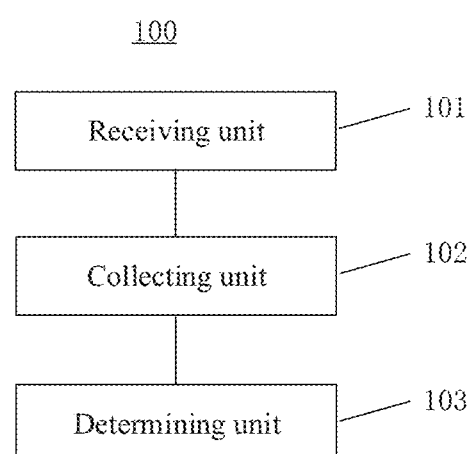
FIG. 21 is a block diagram of an indoor navigation apparatus according to an example of the disclosure.

FIG. 21 is a block diagram of an indoor navigation apparatus according to an example of the disclosure. The indoor navigation apparatus is applied to navigation equipment. Referring to FIG. 21, the indoor navigation apparatus 100 includes a receiving unit 101, a collecting unit 102, and a determining unit 103.

The receiving unit 101 is configured to receive an instruction for navigation.

The collecting unit 102 is configured to collect an environment image.

The determining unit 103 is configured to extract an instruction room feature and an instruction object feature carried in the instruction, and determine a visual room feature, a visual object feature, and a view angle feature based on the environment image; fuse the instruction object feature and the visual object feature with a first knowledge graph representing an indoor object association relationship to obtain an object feature, and determine a room feature based on the visual room feature and the instruction room feature; and determine a navigation decision based on the view angle feature, the room feature, and the object feature.

In some examples, the determining unit 103 fuses the instruction object feature and the visual object feature with a first knowledge graph representing the indoor object association relationship to obtain the object feature by using the following manner: extracting an object entity carried in the environment image based on the visual object feature; constructing a second knowledge graph based on the object entity and the first knowledge graph representing the indoor object association relationship, where the second knowledge graph is configured to represent an association relationship between the object entity and a first object entity in the first knowledge graph that has an association relationship with the object entity; performing multi-step graph convolutional reasoning on the first knowledge graph and the second knowledge graph respectively so as to obtain first knowledge graph reasoning information and second knowledge graph reasoning information; fusing the first knowledge graph reasoning information with the second knowledge graph reasoning information, and updating the first knowledge graph by using the fused knowledge graph reasoning information; performing a first feature fusing and reinforcing operation on the instruction object feature based on the second knowledge graph to obtain an enhanced instruction object feature; and performing a second feature fusing and reinforcing operation on the updated first knowledge graph and the enhanced instruction object feature to obtain an object feature.

In some examples, the determining unit 103 determines the room feature based on the visual room feature and the instruction room feature by using the following manner: determining a visual room category carried in each of the optional view angles based on the visual room feature, and determining an instruction room category carried in each of the optional view angles based on the instruction room feature; determining a room confidence level of each of the optional view angles based on the visual room category, the instruction room category, and a preset room association matrix; and determining the room feature based on the room confidence level of each of the optional view angles.

In some examples, the determining unit 103 determines the navigation decision based on the view angle feature, the room feature, and the object feature by using the following manner: determining a total view angle feature of the environment image based on the view angle feature; splicing the total view angle feature, the object feature, the instruction room feature, and the instruction object feature to obtain a scenario memory token and obtain current navigation progress information based on the scenario memory token, and splicing the room feature and the view angle feature to obtain an optional view angle feature; and performing a third feature fusing and reinforcing operation on the optional view angle feature and the current navigation progress information to obtain the navigation decision for a next navigation progress.

In some examples, the determining unit 103 determines the total view angle feature of the environment image based on the view angle feature by using the following manner: determining a previous navigation progress information; and performing a fourth feature fusing and reinforcing operation on the view angle feature and the previous navigation progress information to obtain the total view angle feature of the environment image.

In some examples, the determining unit 103 is further configured to: determine a penalty coefficient based on a deviation degree between a view angle in the navigation decision and an optimal view angle, where the optimal view angle is the optional view angle that is closest to a navigation end point among all the optional view angles; and change the view angle in the navigation decision based on the penalty coefficient.

In some examples, the determining unit 103 determines the navigation decision by using the following manner: determining the navigation decision based on a vision-language navigation model. The vision-language navigation model is obtained by training by using the following manner: determining a total loss function based on an imitation learning loss function, a room category prediction loss function, and a direction perception loss function, where the imitation learning loss function is configured to represent a deviation degree between the optional view angle and the optimal view angle, the room category prediction loss function is configured to represent a deviation degree between a room category corresponding to the optional view angle and a room category in the navigation decision, and the direction perception loss function is configured to represent a deviation degree between the view angle in the navigation decision and the optimum view angle; and training the navigation model based on the total loss function.

In some examples, the determining unit 103 is further configured to: determine the value of logit of each of the optional view angles; determine a backtracking distance between each of the optional view angles and a current position; and modify the value of logit of each of the optional view angles based on the backtracking distance, and change the view angle in the navigation decision based on the modified values of logit.

For the apparatus in the foregoing examples, the specific manner in which each module implements the operations has been described in the examples of the method in detail, and no further elaboration is provided herein.

Figure 22:
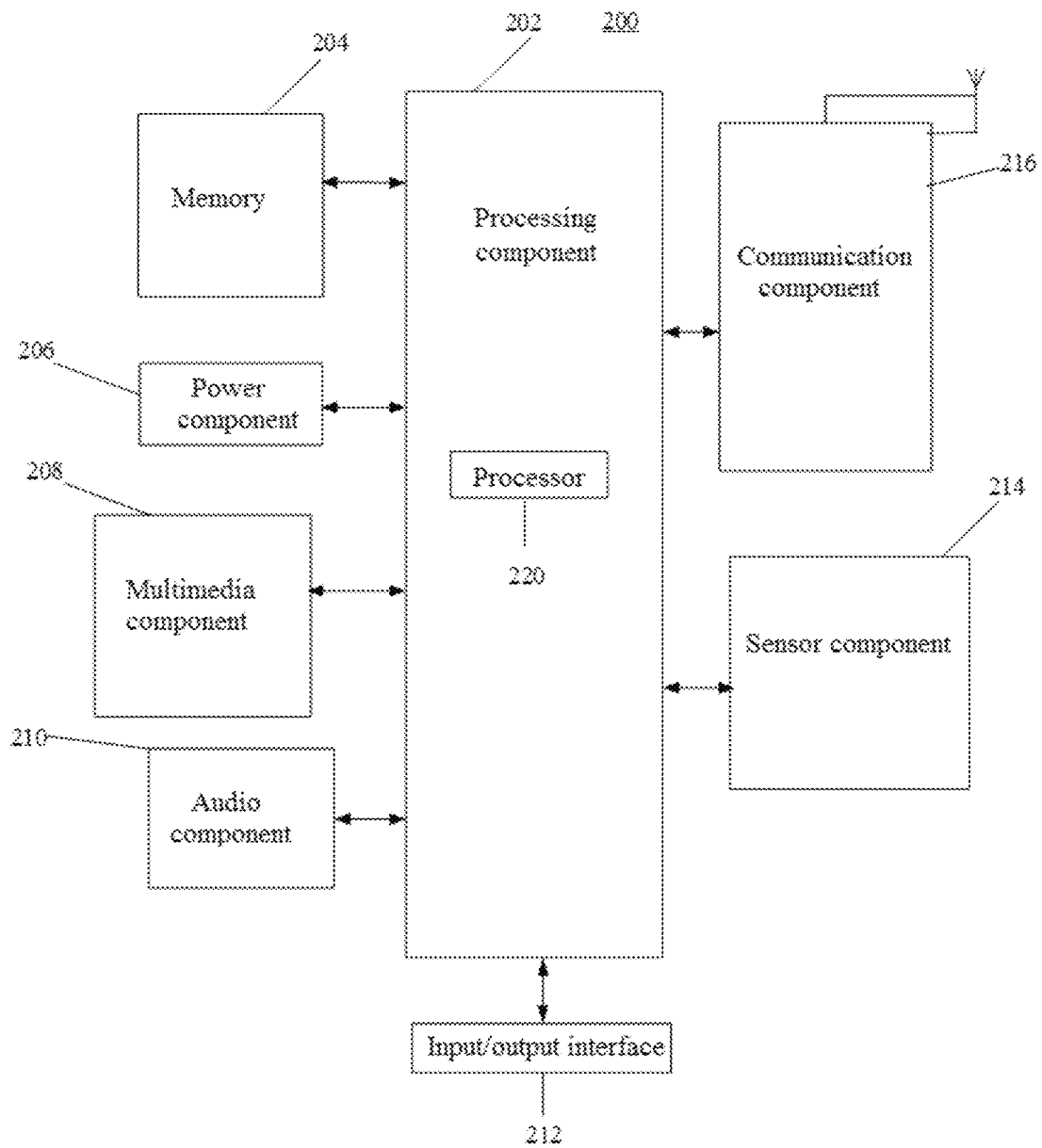
FIG. 22 is a block diagram of an apparatus for indoor navigation according to an example of the disclosure.

FIG. 22 is a block diagram of an apparatus 200 for indoor navigation according to an example of the disclosure. For example, the apparatus 200 may be a mobile phone, a computer, a digital broadcasting terminal, a message transmitter-receiver, a game console, a tablet device, a medical device, fitness equipment, a personal digital assistant, or the like.

Referring to FIG. 22, the apparatus 200 may include one or more of the following components: a processing component 202, a memory 204, a power component 206, a multimedia component 208, an audio component 210, an input/output (I/O) interface 212, a sensor component 214, and a communication component 216.

The processing component 202 usually controls overall operations of the apparatus 200, such as operations associated with display, phone call, data communication, camera operation, and recording operation. The processing component 202 may include one or more processors 220 to execute instructions, so as to complete all or some of the steps of the foregoing method. In addition, the processing component 202 may include one or more modules to facilitate the interaction between the processing component 202 and other components. For example, the processing component 202 may include a multimedia module to facilitate the interaction between the multimedia component 208 and the processing component 202.

The memory 204 is configured to store various types of data to support operation in the apparatus 200. Examples of these data include instructions for any application or method, contact person data, telephone directory data, messages, images, videos, and the like for operation on the apparatus 200. The memory 204 may be implemented by any type of volatile or non-volatile storage devices or combinations thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or a compact disc.

The power component 206 supplies power for various components of the apparatus 200. The power component 206 may include a power management system, one or more power supplies, and other components associated with generation, management and power distribution of the apparatus 200.

The multimedia component 208 includes a screen for providing one output interface between the apparatus 200 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touching, sliding and gestures on the touch panel. The touch sensor can not only sense a boundary of touching or sliding action, but also detect duration and pressure associated with the touching or sliding operation. In some examples, the multimedia component 208 includes a front camera and/or a rear camera. When the apparatus 200 is in an operation mode, such as a shooting mode or a video mode, the front camera and/or the rear camera can receive external multimedia data. Each of the front camera and the rear camera may be a fixed optimal lens system or has a focal length and an optical zooming capability.

The audio component 210 is configured to output and/or input audio signals. For example, the audio component 210 includes a microphone (MIC). When the apparatus 200 is in an operation mode, such as a call mode, a recording mode, or a voice recognition mode, the microphone is configured to receive external audio signals. The received audio signals may be further stored in the memory 204 or transmit by using the communication component 216. In some examples, the audio component 210 further include a loudspeaker for outputting audio signals.

The I/O interface 212 provides an interface between the processing component 202 and a peripheral interface module. The foregoing peripheral interface module may be a keyboard, a click wheel, buttons, or the like. These buttons may include but are not limited to: a home button, a volume button, a start button, and a locking press button.

The sensor component 214 includes one or more sensors for providing state evaluation of the apparatus 200 in all aspects. For example, the sensor component 214 can detect an on/off state of the apparatus 200 and perform relative positioning of the component, for example, the component is a display or small keyboard of the apparatus 200. The sensor component 214 can further detect the position change of the apparatus 200 or one component of the apparatus 200, the existence or non-existence of contact between the user and the apparatus 200, the orientation or acceleration/deceleration of the apparatus 200, and the temperature change of the apparatus 200. The sensor component 214 may include a proximity sensor configured to detect the existence of objects nearby in the absence of any physical contact. The sensor component 214 may further include a light sensor, such as a CMOS or CDD image sensor, and is used in imaging application. In some examples, the sensor component 214 may further include an acceleration sensor, a gyroscope sensor, a magnetic sensor, a pressure sensor, or a temperature sensor.

The communication component 216 is configured to facilitate the wired or wireless communication between the apparatus 200 and other equipment. The apparatus 200 may be connected to a wireless network, such as WiFi, 2G or 3G, or combinations thereof, based on a communication criterion. In an example, the communication component 216 receives broadcasting signals or broadcasting-related information from an external broadcasting management system through a broadcasting channel. In an example, the communication component 216 further includes a near field communication (NFC) module to promote short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 200 may be implemented by one or more application-specific integrated circuits (ASIC), a digital signal processor (DSP), a digital signal processing device (DSPD), a programmable-logic device (PLD), a field programmable gate array (FPGA), a controller, a microcontroller, a microprocessor, or other electronic elements, and is configured to execute the foregoing method.

In an example, a non-transitory computer-readable storage medium including an instruction is further provided, such as a memory 204 including an instruction. The instruction may be executed by the processor 220 of the apparatus 200 to complete the foregoing method. For example, the non-transitory computer-readable storage medium may be an ROM, a random access memory (RAM), a CD-ROM, a magnetic tape, a floppy disk, an optical data storage device, or the like.

It may be understood that "a plurality of" in the disclosure refers to two or more than two, which is similar to other quantifiers. The term "and/or" is an associative relationship for describing associated objects, indicating that three relationships may exist. For example, A and/or B may represent the following three cases: Only A exists, both A and B exist, and only B exists. The symbol "/" generally represents an "or" relationship between associated objects. The terms "a/an", "the" and "this" of singular forms are also intended to include plural forms, unless otherwise specified in the context clearly.

It may be further understood that, although the terms such as "first" and "second" are used to describe various types of information, the information shall not be limited to the terms. The terms are only used to distinguish between information of the same type, but not to represent a specific order or importance degree. Actually, the expressions such as "first" and "second" are totally interchangeable. For example, without departing from the scope of the disclosure, the first information may also be referred to as second information, and likewise, the second information may also be referred to as first information.

It may be further understood that, unless otherwise specified, "connection" includes direct connection between two components in the absence of other components, and also includes indirect connection between two components in the presence of other components.

It may be further understood that, in the examples of the disclosure, although operations are described in the accompanying drawings in a specific order, this shall not be understood as that the operations are required to be performed in a specific order or serial order or that all the operations are required to be performed to obtain an expected result. In a specific environment, multitasking and parallel processing may be favorable.

A skilled person in the art easily thinks of other examples of the disclosure after considering the description and practicing the disclosed content. This application is intended to cover any modifications, uses, or adaptive changes of the disclosure. These modifications, uses, or adaptive changes abide by the general principle of the disclosure and include common general knowledge or conventional technical means in the technical field undisclosed in the disclosure. The description and the examples are merely examples. The true scope and spirit of the disclosure are defined by the following claims.

It should be understood that the disclosure is not limited to the precise structure that has already been described above and illustrated in the accompanying drawings, and various modifications and variations can be made without departing from the scope of the disclosure.

The invention claimed is:

1. An indoor navigation method, applied to a navigation equipment, wherein the indoor navigation method comprises:
receiving an instruction for navigation, and collecting an environment image;
extracting an instruction room feature and an instruction object feature carried in the instruction, and determining a visual room feature, a visual object feature, and a view angle feature based on the environment image, wherein the instruction room feature is configured to indicate room information obtained from the instruction for navigation, the instruction object feature is configured to indicate object information obtained from the instruction for navigation, the visual room feature is configured to indicate room information obtained from the environment image, the visual object feature is configured to indicate object information obtained from the environment image, and the view angle feature is configured to reflect information carried in an view angle of the environment image;

fusing the instruction object feature and the visual object feature with a first knowledge graph representing an indoor object association relationship to obtain an object feature, and determining a room feature based on the visual room feature and the instruction room feature; and determining a navigation decision based on the view angle feature, the room feature, and the object feature;

wherein fusing the instruction object feature and the visual object feature with the first knowledge graph representing the indoor object association relationship to obtain the object feature comprises:

extracting an object entity carried in the environment image based on the visual object feature;

constructing a second knowledge graph based on the object entity and the first knowledge graph representing the indoor object association relationship, wherein the second knowledge graph is configured to represent an association relationship between the object entity and a first object entity in the first knowledge graph that has an association relationship with the object entity;

performing multi-step graph convolutional reasoning on the first knowledge graph and the second knowledge graph respectively so as to obtain first knowledge graph reasoning information and second knowledge graph reasoning information;

fusing the first knowledge graph reasoning information with the second knowledge graph reasoning information, and updating the first knowledge graph by using the fused knowledge graph reasoning information;

performing a first feature fusing and reinforcing operation on the instruction object feature based on the second knowledge graph to obtain an enhanced instruction object feature; and performing a second feature fusing and reinforcing operation on the updated first knowledge graph and the enhanced instruction object feature to obtain the object feature; and wherein determining the room feature based on the visual room feature and the instruction room feature comprises:

determining a visual room category carried in each of optional view angles based on the visual room feature, and determining an instruction room category carried in each of the optional view angles based on the instruction room feature;

determining a room confidence level of each of the optional view angles based on the visual room category, the instruction room category, and a preset room correlation matrix; and determining the room feature based on the room confidence level of each of the optional view angles.

2. The indoor navigation method according to claim 1, wherein determining the navigation decision based on the view angle feature, the room feature, and the object feature comprises:

determining a total view angle feature of the environment image based on the view angle feature;

splicing the total view angle feature, the object feature, the instruction room feature, and the instruction object feature to obtain a scenario memory token and obtain current navigation progress information based on the scenario memory token, and splicing the room feature and the view angle feature to obtain an optional view angle feature; and performing a third feature fusing and reinforcing operation on the optional view angle feature and the current navigation progress information to obtain a navigation decision for a next navigation progress.

3. The indoor navigation method according to claim 2, wherein determining the total view angle feature of the environment image based on the view angle feature comprises:

determining a previous navigation progress information; and performing a fourth feature fusing and reinforcing operation on the view angle feature and the previous navigation progress information to obtain the total view angle feature of the environment image.

4. The indoor navigation method according to claim 1, wherein the indoor navigation method further comprises:

determining a penalty coefficient based on a deviation degree between a view angle in the navigation decision and an optimal view angle, wherein the optimal view angle is an optional view angle that is closest to a navigation end point among all the optional view angles; and changing the view angle in the navigation decision based on the penalty coefficient.

5. The indoor navigation method according to claim 4, wherein determining the navigation decision comprises:

determining the navigation decision based on a vision-language navigation model;

obtaining the vision-language navigation model by training by determining a total loss function based on an imitation learning loss function, a room category prediction loss function, and a direction perception loss function, the imitation learning loss function is configured to represent a deviation degree between the optional view angle and the optimal view angle, the room category prediction loss function is configured to represent a deviation degree between a room category corresponding to the optional view angle and a room category in the navigation decision, and the direction perception loss function is configured to represent a deviation degree between the view angle in the navigation decision and the optimal view angle; and training the vision-language navigation model based on the total loss function.

6. The indoor navigation method according to claim 1, wherein the indoor navigation method further comprises:

determining a value of logit of each of the optional view angles, and determining a backtracking distance between each of the optional view angles and a current position; and modifying the value of logit of each of the optional view angles based on the backtracking distance, and changing the view angle in the navigation decision based on the modified values of logit.

7. An indoor navigation equipment, comprising:

one or more processors; and one or more memories configured to store instructions executable by the processor;

wherein the processor is configured to:

receive an instruction for navigation, and collect an environment image;

extract an instruction room feature and an instruction object feature carried in the instruction, and determine a visual room feature, a visual object feature, and a view angle feature based on the environment image, wherein the instruction room feature is configured to indicate room information obtained from the instruction for navigation, the instruction object feature is configured to indicate object information obtained from the instruction for navigation, the visual room feature is configured to indicate room information obtained from the environment image, the visual object feature is configured to indicate object information obtained from the environment image, and the view angle feature is configured to reflect information carried in an view angle of the environment image;

fuse the instruction object feature and the visual object feature with a first knowledge graph representing an indoor object association relationship to obtain an object feature, and determine a room feature based on the visual room feature and the instruction room feature; and determine a navigation decision based on the view angle feature, the room feature, and the object feature;

wherein the processor is further configured to:
extract an object entity carried in the environment image based on the visual object feature;
construct a second knowledge graph based on the object entity and the first knowledge graph representing the indoor object association relationship, wherein the second knowledge graph is configured to represent an association relationship between the object entity and a first object entity in the first knowledge graph that has an association relationship with the object entity;
perform multi-step graph convolutional reasoning on the first knowledge graph and the second knowledge graph respectively so as to obtain first knowledge graph reasoning information and second knowledge graph reasoning information;
fuse the first knowledge graph reasoning information with the second knowledge graph reasoning information, and update the first knowledge graph by using the fused knowledge graph reasoning information;
perform a first feature fusing and reinforcing operation on the instruction object feature based on the second knowledge graph to obtain an enhanced instruction object feature; and
perform a second feature fusing and reinforcing operation on the updated first knowledge graph and the enhanced instruction object feature to obtain the object feature; and wherein the processor is further configured to:
determine a visual room category carried in each of optional view angles based on the visual room feature, and determine an instruction room category carried in each of the optional view angles based on the instruction room feature;
determine a room confidence level of each of the optional view angles based on the visual room category, the instruction room category, and a preset room correlation matrix; and
determine the room feature based on the room confidence level of each of the optional view angles.

8. The indoor navigation equipment according to claim 7, wherein the processor is further configured to:
determine a total view angle feature of the environment image based on the view angle feature;
splice the total view angle feature, the object feature, the instruction room feature, and the instruction object feature to obtain a scenario memory token and obtain current navigation progress information based on the scenario memory token, and splice the room feature and the view angle feature to obtain an optional view angle feature; and
perform a third feature fusing and reinforcing operation on the optional view angle feature and the current navigation progress information to obtain a navigation decision for a next navigation progress.

9. The indoor navigation equipment according to claim 8, wherein the processor is further configured to:
determine a previous navigation progress information; and
perform a fourth feature fusing and reinforcing operation on the view angle feature and the previous navigation progress information to obtain the total view angle feature of the environment image.

10. The indoor navigation equipment according to claim 7, wherein the processor is further configured to:
determine a penalty coefficient based on a deviation degree between a view angle in the navigation decision and an optimal view angle, wherein the optimal view angle is an optional view angle that is closest to a navigation end point among all the optional view angles; and
change the view angle in the navigation decision based on the penalty coefficient.

11. The indoor navigation equipment according to claim 10, wherein the processor is further configured to:
determine the navigation decision based on a vision-language navigation model;
obtain the vision-language navigation model by training by determining a total loss function based on an imitation learning loss function, a room category prediction loss function, and a direction perception loss function, the imitation learning loss function is configured to represent a deviation degree between the optional view angle and the optimal view angle, the room category prediction loss function is configured to represent a deviation degree between a room category corresponding to the optional view angle and a room category in the navigation decision, and the direction perception loss function is configured to represent a deviation degree between the view angle in the navigation decision and the optimal view angle; and
train the vision-language navigation model based on the total loss function.

12. The indoor navigation equipment according to claim 7, wherein the processor is further configured to:
determine a value of logit of each of the optional view angles, and determine a backtracking distance between each of the optional view angles and a current position; and
modify the value of logit of each of the optional view angles based on the backtracking distance, and change the view angle in the navigation decision based on the modified values of logit.

13. A non-transitory computer-readable storage medium, wherein when an instruction in the storage medium is executed by a processor of a mobile terminal, the mobile terminal is capable of executing an indoor navigation method, and the method comprises:
receiving an instruction for navigation, and collecting an environment image;
extracting an instruction room feature and an instruction object feature carried in the instruction, and determining a visual room feature, a visual object feature, and a view angle feature based on the environment image, wherein the instruction room feature is configured to indicate room information obtained from the instruction for navigation, the instruction object feature is configured to indicate object information obtained from the instruction for navigation, the visual room feature is configured to indicate room information obtained from the environment image, the visual object feature is configured to indicate object information obtained from the environment image, and the view angle feature is configured to reflect information carried in an view angle of the environment image;

fusing the instruction object feature and the visual object feature with a first knowledge graph representing an indoor object association relationship to obtain an object feature, and determining a room feature based on the visual room feature and the instruction room feature; and determining a navigation decision based on the view angle feature, the room feature, and the object feature;

wherein fusing the instruction object feature and the visual object feature with a first knowledge graph representing the indoor object association relationship to obtain the object feature comprises:

extracting an object entity carried in the environment image based on the visual object feature;

constructing a second knowledge graph based on the object entity and the first knowledge graph representing the indoor object association relationship, wherein the second knowledge graph is configured to represent an association relationship between the object entity and a first object entity in the first knowledge graph that has an association relationship with the object entity;

performing multi-step graph convolutional reasoning on the first knowledge graph and the second knowledge graph respectively so as to obtain first knowledge graph reasoning information and second knowledge graph reasoning information;

fusing the first knowledge graph reasoning information with the second knowledge graph reasoning information, and updating the first knowledge graph by using the fused knowledge graph reasoning information;

performing a first feature fusing and reinforcing operation on the instruction object feature based on the second knowledge graph to obtain an enhanced instruction object feature; and performing a second feature fusing and reinforcing operation on the updated first knowledge graph and the enhanced instruction object feature to obtain the object feature; and wherein determining the room feature based on the visual room feature and the instruction room feature comprises:

determining a visual room category carried in each of optional view angles based on the visual room feature, and determining an instruction room category carried in each of the optional view angles based on the instruction room feature;

determining a room confidence level of each of the optional view angles based on the visual room category, the instruction room category, and a preset room correlation matrix; and determining the room feature based on the room confidence level of each of the optional view angles.

14. The non-transitory computer-readable storage medium according to claim 13, wherein the indoor navigation method further comprises:

determining a penalty coefficient based on a deviation degree between a view angle in the navigation decision and an optimal view angle, wherein the optimal view angle is an optional view angle that is closest to a navigation end point among all the optional view angles; and changing the view angle in the navigation decision based on the penalty coefficient.

15. The storage medium according to claim 13, wherein the indoor navigation method further comprises:

determining a value of logit of each of the optional view angles, and determining a backtracking distance between each of the optional view angles and a current position; and modifying the value of logit of each of the optional view angles based on the backtracking distance, and changing the view angle in the navigation decision based on the modified values of logit.

\* \* \* \* \*